United States Patent
Bai et al.

(10) Patent No.: US 11,743,928 B2
(45) Date of Patent: Aug. 29, 2023

(54) TECHNIQUES FOR AUTONOMOUSLY UPDATING A TRANSMISSION CONFIGURATION INDICATOR (TCI) STATE ASSOCIATED WITH A NONSERVING CELL REFERENCE SIGNAL

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/179,259

(22) Filed: Feb. 18, 2021

(65) Prior Publication Data
US 2022/0264577 A1 Aug. 18, 2022

(51) Int. Cl.
*H04W 24/10* (2009.01)
*H04W 72/53* (2023.01)
(Continued)

(52) U.S. Cl.
CPC .......... *H04W 72/53* (2023.01); *H04L 5/0048* (2013.01); *H04L 5/0053* (2013.01); *H04W 24/10* (2013.01);
(Continued)

(58) Field of Classification Search
CPC ............. H04W 72/0493; H04W 24/10; H04W 72/0446; H04W 72/046; H04W 36/0085;
(Continued)

(56) References Cited

U.S. PATENT DOCUMENTS

| 2017/0366324 A1* | 12/2017 | Seo ..................... H04W 72/042 |
| 2020/0413306 A1* | 12/2020 | Decarreau ......... H04W 36/0058 |
| 2022/0159417 A1* | 5/2022 | Zhou ....................... H04W 4/06 |

FOREIGN PATENT DOCUMENTS

| WO | WO-2018232090 A1 | 12/2018 |
| WO | WO-2022084955 A1 * | 4/2022 |

OTHER PUBLICATIONS

International Search Report and Written Opinion—PCT/US2021/073146—ISA/EPO—dated Jun. 15, 2022.
(Continued)

*Primary Examiner* — Thai Nguyen
(74) *Attorney, Agent, or Firm* — Arun Swain; Holland & Hart LLP

(57) ABSTRACT

This disclosure provides systems, methods and apparatus, including computer programs encoded on computer storage media, for autonomously updating a transmission configuration indicator (TCI) state associated with a reference signal of a non-serving cell according to a measurement report for the reference signal. In one aspect, a user equipment (UE) may measure the reference signal of the non-serving cell and, in line with the results of the measurement, may apply an update for the TCI state associated with the reference signal upon or after transmitting the measurement report to a serving cell and according to a rule for applying TCI state updates for non-serving cell reference signals. The rule for applying TCI state updates for non-serving cell reference signals may be known to the UE and the serving cell such that the UE and the serving cell maintain same knowledge of the associations between non-serving cell reference signals and TCI states.

30 Claims, 7 Drawing Sheets

(51) Int. Cl.
*H04L 5/00* (2006.01)
*H04W 72/0446* (2023.01)
*H04W 72/044* (2023.01)

(52) U.S. Cl.
CPC ..... *H04W 72/046* (2013.01); *H04W 72/0446* (2013.01)

(58) Field of Classification Search
CPC .......... H04W 72/1231; H04W 72/1289; H04L 5/0048; H04L 5/0053; H04L 5/0035; H04L 5/0091; H04L 5/0023; H04B 7/0695; H04B 7/0822
See application file for complete search history.

(56) References Cited

OTHER PUBLICATIONS

"3rd Generation Partnership Project, Technical Specification Group Radio Access Network, NR, Requirements for Support of Radio Resource Management (Release 17)", 3GPP Standard, Technical Specification, 3GPP TS 38.133, 3rd Generation Partnership Project (3GPP), Mobile Competence Centre, 650, Route Des Lucioles, F-06921 Sophia-Antipolis Cedex, France, vol. RAN WG4, No. V17.0.0 Jan. 12, 2021 (Jan. 12, 2021), XP051999669, pp. 42-422 (435 Pages), Retrieved from the Internet: URL: https://ftp.3gpp.org/Specs/archive/38_series/38.133/38133-h00.zip 38133-h00_s0-11.docx [retrieved on Jan. 12, 2021] Section 9.5 and Corresponding Subsections.

Mediatek Inc: "Enhancement on Multi-Beam Operation", 3GPP Draft, 3GPP TSG RAN WG1 #104-e, R1-2100588, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25-Feb. 5, 2021 Jan. 19, 2021 (Jan. 19, 2021), XP051971059, 27 Pages, Retrieved from the Internet: URL: https://ftp.3gpp.org/tsg_ran/WG1_RL1/TSGR1_104-e/Docs/R1-2100588.zip R1-2100588_MB_final.docx [retrieved on Jan. 19, 2021] Section 2.1.5, Proposals 11-13, Section 2.3, Section 2.3.4, Section 2, 2.2.1, 2.2.2, 2.3.2.

Partial International Search Report—PCT/US2021/073146—ISA/EPO—dated Apr. 25, 2022.

* cited by examiner

TECHNIQUES FOR AUTONOMOUSLY UPDATING A TRANSMISSION CONFIGURATION INDICATOR (TCI) STATE ASSOCIATED WITH A NONSERVING CELL REFERENCE SIGNAL

TECHNICAL FIELD

The following relates to wireless communications, including techniques for autonomously updating a transmission configuration indicator (TCI) state associated with a non-serving cell reference signal.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

In some systems, a UE may receive one or more reference signals from a serving cell, such as from a serving BS, and each of the one or more reference signals may be associated with a transmission configuration indicator (TCI) state and quasi-colocation (QCL) information indicating a beam direction of that reference signal.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving, from a serving cell, a configuration for the UE to measure a reference signal of a non-serving cell, measuring the reference signal of the non-serving cell, transmitting a measurement report to the serving cell, where transmitting the measurement report triggers an update for a transmission configuration indicator (TCI) state associated with the reference signal of the non-serving cell, and applying the update for the TCI state associated with the reference signal.

Another innovative aspect of the subject matter described in this disclosure can be implemented in an apparatus for wireless communications at a UE. The apparatus may include a first interface, a second interface, and a processing system. The first interface may be configured to obtain, from a serving cell, a configuration for the UE to measure a reference signal of a non-serving cell. The processing system may be configured to measure the reference signal of the non-serving cell. The first interface or the second interface may be configured to output a measurement report to the serving cell, where outputting the measurement report triggers an update for a TCI state associated with the reference signal of the non-serving cell. The processing system may be configured to apply the update for the TCI state associated with the reference signal.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive, from a serving cell, a configuration for the UE to measure a reference signal of a non-serving cell, measure the reference signal of the non-serving cell, transmit a measurement report to the serving cell, where transmitting the measurement report triggers an update for a TCI state associated with the reference signal of the non-serving cell, and apply the update for the TCI state associated with the reference signal.

Another innovative aspect of the subject matter described in this disclosure can be implemented in another apparatus for wireless communications at a UE. The apparatus may include means for receiving, from a serving cell, a configuration for the UE to measure a reference signal of a non-serving cell, means for measuring the reference signal of the non-serving cell, means for transmitting a measurement report to the serving cell, where transmitting the measurement report triggers an update for a TCI state associated with the reference signal of the non-serving cell, and means for applying the update for the TCI state associated with the reference signal.

Another innovative aspect of the subject matter described in this disclosure can be implemented in a non-transitory computer-readable medium storing code for wireless communications at a UE. The code may include instructions executable by a processor to receive, from a serving cell, a configuration for the UE to measure a reference signal of a non-serving cell, measure the reference signal of the non-serving cell, transmit a measurement report to the serving cell, where transmitting the measurement report triggers an update for a TCI state associated with the reference signal of the non-serving cell, and apply the update for the TCI state associated with the reference signal.

One innovative aspect of the subject matter described in this disclosure can be implemented in a method for wireless communications at a base station (BS). The method may include transmitting, to a UE, a configuration for the UE to measure a reference signal of a non-serving cell, receiving a measurement report from the UE, where receiving the measurement report triggers an update for a TCI state associated with the reference signal of the non-serving cell, and applying the update for the TCI state associated with the reference signal.

Another innovative aspect of the subject matter described in this disclosure can be implemented in an apparatus for wireless communications at a BS. The apparatus may include a first interface, a second interface, and a processing system. The first interface may be configured to output, to a UE, a configuration for the UE to measure a reference signal of a non-serving cell. The first interface or the second interface may be configured to obtain a measurement report from the UE, where obtaining the measurement report triggers an update for a TCI state associated with the reference signal of the non-serving cell. The processing system may be configured to apply the update for the TCI state associated with the reference signal.

Another innovative aspect of the subject matter described in this disclosure can be implemented in another apparatus for wireless communications at a BS. The apparatus may include a processor, memory coupled with the processor, and instructions stored in the memory. The instructions may be executable by the processor to cause the apparatus to transmit, to a UE, a configuration for the UE to measure a reference signal of a non-serving cell, receive a measurement report from the UE, where receiving the measurement report triggers an update for a TCI state associated with the reference signal of the non-serving cell, and apply the update for the TCI state associated with the reference signal.

Another innovative aspect of the subject matter described in this disclosure can be implemented in another apparatus for wireless communications at a BS. The apparatus may include means for transmitting, to a UE, a configuration for the UE to measure a reference signal of a non-serving cell, means for receiving a measurement report from the UE, where receiving the measurement report triggers an update for a TCI state associated with the reference signal of the non-serving cell, and means for applying the update for the TCI state associated with the reference signal.

Another innovative aspect of the subject matter described in this disclosure can be implemented in a non-transitory computer-readable medium storing code for wireless communications at a BS. The code may include instructions executable by a processor to transmit, to a UE, a configuration for the UE to measure a reference signal of a non-serving cell, receive a measurement report from the UE, where receiving the measurement report triggers an update for a TCI state associated with the reference signal of the non-serving cell, and apply the update for the TCI state associated with the reference signal.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
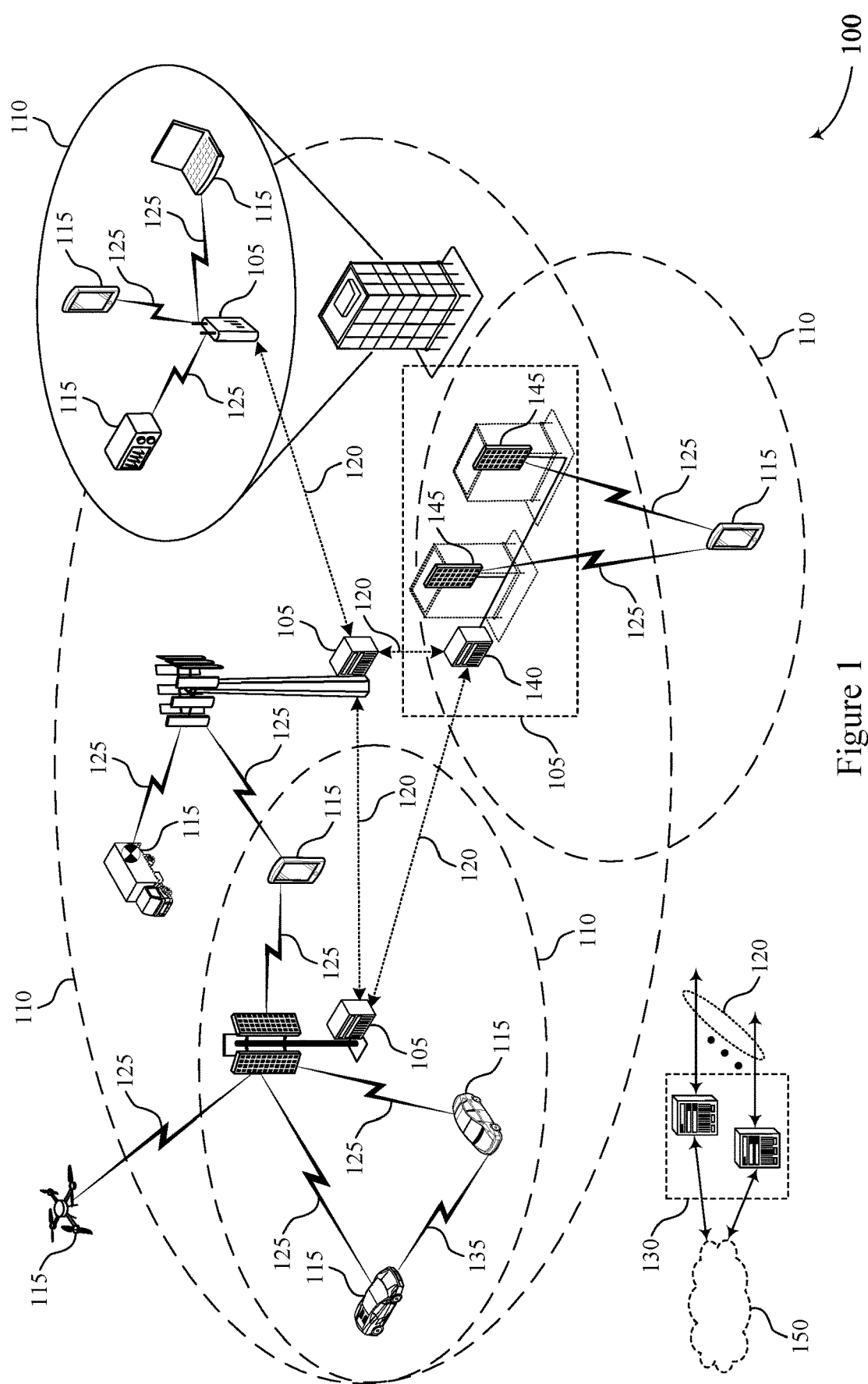
FIG. 1 illustrates an example of a wireless communications system that supports techniques for autonomously updating a transmission configuration indicator (TCI) state associated with a non-serving cell reference signal.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

To maintain reliable communication between a user equipment (UE) and one or more serving cells, the UE may measure one or more reference signals from the one or more serving cells as part of a beam management procedure (such as part of a P2 sweep, which may be an example of a beam refinement procedure in which a serving cell sweeps a relatively narrower beam over a narrower range relative to a P1 sweep or an initial beam selection procedure). Each of the one or more reference signals may be associated with a transmission configuration indicator (TCI) state, and the UE may use a TCI state associated with a reference signal to identify which directional beam is used to transmit the reference signal (such that the UE may monitor for the reference signal using an appropriate receive beam). In some deployments, the UE may additionally monitor for one or more reference signals from one or more non-serving cells. To support inter-cell mobility, each of the one or more non-serving cell reference signals also may be associated with a TCI state. If the UE moves around, however, the UE may become closer to or farther from a non-serving cell, which may result in the reference signals from that non-serving cell becoming more or less relevant. In other words, the relevant non-serving cell reference signals for which the UE monitors may change as the UE changes location. As such, the TCI states that are configured for the non-serving cell reference signals may become out-of-date as some of the non-serving cell reference signals become more or less relevant for the UE. The UE, however, may lack an efficient or low-overhead mechanism for updating the TCI states associated with the non-serving cell reference signals.

In some implementations of the present disclosure, the UE may employ a mechanism for autonomously updating a TCI state associated with a non-serving cell reference signal along with transmitting a measurement report including or referring to a measurement of the non-serving cell reference signal. For example, the UE may measure a reference signal from a non-serving cell and may update the TCI state associated with the reference signal based on the measurement (or the measurement report) such that the update to the TCI state is derived or assumed from the measurement. In some implementations, such an update for the TCI state associated with the reference signal may include a replacing of a previous source reference signal of the TCI state with the measured reference signal. In some other implementations, such an update for the TCI state associated with the reference signal may include a deactivating of the TCI state for the reference signal (or for the non-serving cell that transmits the reference signal). The UE may apply the update for the TCI state associated with the reference signal based on (for example, along with or after) transmitting the measurement report to a serving cell and prior to an expiration of a timer for applying the update. In some implementations, for example, the UE may start the timer upon or after transmitting the measurement report and may apply the update for the TCI state prior to an expiration of the timer. Alternatively, in some other implementations, the UE may monitor for an acknowledgement (ACK) from the serving cell responsive to the measurement report, may start the timer upon or after receiving the ACK, and may apply the update for the TCI state prior to an expiration of the timer started upon reception of the ACK.

Particular implementations of the subject matter described in this disclosure can be implemented to realize one or more of the following potential advantages. In some implementations, for example, the UE and the serving cell may maintain up-to-date and mutually understood associations between TCI states and relevant non-serving cell reference signals in line with or according to the measurement report that triggers autonomous TCI state updates by the UE and the serving cell. Further, and based on maintaining the mutually understood associations between TCI states and non-serving cell reference signals that are relevant to the UE, the UE may experience greater inter-cell mobility, which may result in more reliable communication between the UE and the serving cell. As such, the UE may achieve greater throughput and higher data rates. Additionally, if TCI states are associated with non-serving cell reference signals, the UE may experience a lower latency handover of data or control channels to a TCI state of a directional beam of a non-serving cell and achieve more accurate measurements of non-serving cell reference signals. Moreover, the measurement report-based TCI state update may rely on less signaling between the UE and the serving cell as compared to examples in which the serving cell transmits signaling to configure the update for the TCI state at the UE, which may reduce overhead between the UE and the serving cell.

FIG. 1 illustrates an example of a wireless communications system 100 that supports techniques for autonomously updating a TCI state associated with a non-serving cell reference signal. The wireless communications system 100 may include one or more base stations (BSs) 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies (RATs).

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or other interface). The BSs 105 may communicate with one another over the backhaul links 120 (for example, via an X2, Xn, or other interface) either directly (for example, directly between BSs 105), or indirectly (for example, via core network 130), or both. In some examples, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other examples, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given RAT (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different RAT).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some examples, the wireless communications system 100 may include BSs 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier (ID) for distinguishing neighboring cells (for example, a physical cell ID (PCID or PCI), a virtual cell ID (VCID), or others). In some examples, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a BS 105 may be movable and therefore provide communication coverage for a moving geographic coverage area 110. In some examples, different geographic coverage areas 110 associated with different technologies may overlap, but the different geographic coverage areas 110 may be supported by the same BS 105. In some other examples, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different RAT.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable or low-latency functions. Ultra-reliable communications may include private communication or group communication and may be supported by one or more services such as push-to-talk (MCPTT), video (MCVideo), or data (MCData). Support for functions may include prioritization of services, and services may be used for public safety or general commercial applications. The terms ultra-reliable, low-latency, and ultra-reliable low-latency may be used interchangeably herein.

In some examples, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some examples, groups of the UEs 115 communicating via D2D communications may utilize a one-to-many (1-M) system in which each UE 115 transmits to every other UE 115 in the group. In some examples, a BS 105 facilitates the scheduling of resources for D2D communications. In some other examples, D2D communications are carried out between the UEs 115 without the involvement of a BS 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105).

The wireless communications system 100 may operate using one or more frequency bands, such as frequency bands in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the BSs 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some examples, operations in unlicensed bands may be performed using a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some examples, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some examples, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some aspects, a UE 115 may establish a communication link with one or more serving cells, which may be examples of or controlled by one or more BSs 105. The UE 115 may communicate with the one or more serving cells over one or more directional beams and, as the UE 115 changes location or as an environment in which the UE 115 operates changes, the UE 115 may refine which directional beams are used for communication as a result of performing a beam refinement or beam management procedure. For example, the UE 115 may measure one or more reference signals transmitted over various directional beams from cells to which the UE 115 is already connected (which may be referred to herein as serving cells) or from cells to which the UE 115 may connect but is not currently connected (which may be referred to herein as non-serving cells), or both. Each of the one or more reference signals may be associated with a TCI state or QCL information that links that reference signal with a directional beam (such as a directional downlink beam).

In examples in which the UE 115 supports inter-cell mobility, the UE 115 may be configured to monitor for a reference signal from a non-serving cell and, accordingly, may measure the reference signal from the non-serving cell. In some aspects, the reference signal may be associated with a TCI state corresponding to or otherwise conveying information relating to a beam direction over which the reference signal is transmitted from the non-serving cell. In some examples, such as in examples in which the UE 115 moves around or changes physical location, the reference signal from the non-serving cell may become more or less relevant for the UE 115 (depending on whether the UE 115 moves closer to or farther away from the non-serving cell or as a result of other environmental conditions between the UE 115 and the non-serving cell). For example, the UE 115 may operate in a deployment scenario in which multiple cells are present within a relatively small area. In such examples, the UE 115 may update which non-serving cell reference signals to monitor according to the movement of the UE 115 and, as a result, also may update the TCI state associated with the reference signal for which the UE 115 is configured to monitor.

In some implementations, for example, the UE 115 may update the TCI state associated with the reference signal such that the reference signal becomes a source reference signal for the TCI state (as may occur in examples in which the reference signal becomes more relevant for the UE 115) or may deactivate the TCI state associated with the reference signal (as may occur in examples in which the reference signal becomes less relevant for the UE 115). Other types of TCI state updates, such as an activation of a TCI state for the reference signal, are also within the scope of the present disclosure. In some examples, the UE 115 may autonomously initiate such an update for the TCI state associated with the reference signal according to a rule for TCI state updates for non-serving cell reference signals (as provided by a serving cell or a serving BS 105) and as a result of transmitting a measurement report to the serving cell including the measurements of the reference signal (such that transmission of the measurement report may trigger the application of the update for the TCI state). Additional details relating to such an autonomously initiated update for a TCI state associated with a non-serving cell reference signal are described herein, including with reference to FIGS. 2 and 3.

Further, as described herein, a serving cell may refer to any cell with which the UE 115 is actively connected to or with which the UE 115 exchanges data or control signaling. On the other hand, a non-serving cell may refer to any cell with which the UE 115 may potentially establish a connection but with which the UE 115 is not actively connected. For example, the UE 115 and a non-serving cell may not exchange data or control signaling and, as such, the UE 115 may not expect to receive any scheduling information from or associated with any data transmissions from the non-serving cell. Additionally, a serving cell and a non-serving cell may have or be associated with different PCIs. For example, The UE 115 may use a PCI of a serving cell to decode data (data packages) transmitted from the serving cell (for example, the physical layer of data may be scrambled by a sequence determined by or derived from PCI). The UE 115 also may use the PCI of the serving cell to generate a sequence for one or more reference signals (for example, the UE 115 may use the PCI as a seed to generate a sequence) or to identify a configuration of a CRS of the serving cell, and such a serving cell PCI may be distinct from a non-serving cell PCI.

Figure 2:
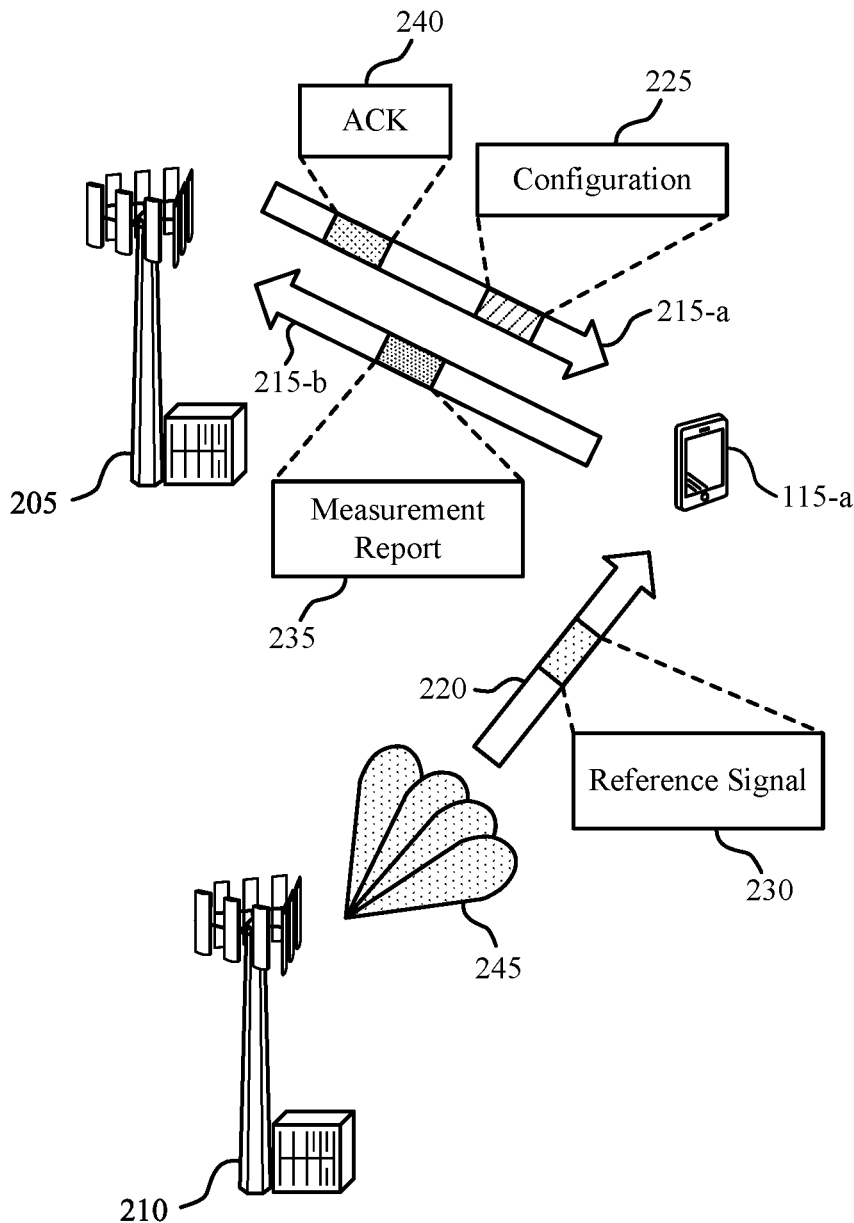
FIG. 2 illustrates an example of a signaling diagram that supports techniques for autonomously updating a TCI state associated with a non-serving cell reference signal.

FIG. 2 illustrates an example of a signaling diagram 200 that supports techniques for autonomously updating a TCI state associated with a non-serving cell reference signal. The signaling diagram 200 may implement or be implemented to realize aspects of the wireless communications system 100. For example, the signaling diagram 200 may illustrate communication between a UE 115-*a*, a serving cell 205, and a non-serving cell 210, which may be examples of corresponding devices described herein, including with reference to FIG. 1. In some examples, the UE 115-*a* may measure a reference signal 230 transmitted from the non-serving cell 210 and may autonomously initiate an update for a TCI state associated with the reference signal 230 as a result of or after transmitting a measurement report 235 to the serving cell 205.

For example, the UE 115-*a* may support an association between TCI states and non-serving cell reference signals (such as the reference signal 230) and may leverage the association of non-serving cell reference signals with TCI states to support inter-cell mobility, including layer 1 (L1) or layer 2 (L2) centric inter-cell mobility procedures. In some implementations, L1 may be equivalent to or include a physical layer, and L2 may be equivalent to or include one or more of a media access control (MAC) layer, a radio link control (RLC) layer, or a packet data convergence protocol (PDCP) layer.

As such, the UE 115-*a* may measure and report on non-serving cell reference signals to obtain and provide information to the serving cell 205 on how a metric (such as an L1 or L2 metric) of a non-serving cell reference signal compares to a metric (such as an L1 or L2 metric) of a reference signal transmitted by the serving cell 205 (or any other serving or non-serving cell). For example, the UE 115-*a* may extend a measurement and reporting framework (for example, an L1 measurement and reporting framework) associated with serving cell reference signals to non-serving cell reference signals to obtain and transmit measurement information involving one or more non-serving cells (such as the non-serving cell 210).

As such, the UE 115-*a* may achieve a more accurate measurement of one or more directional beams 245 of the non-serving cell 210 as a result of associating the reference signal 230 with a TCI state of the non-serving cell 210. For instance, the non-serving cell 210 may be associated with one or more TCI states that define or indicate directions or QCL information of the various directional beams 245 over which the non-serving cell 210 may transmit the reference signal 230 and the UE 115-*a* may use such definitions for accurately keeping track of strongest directional beams 245 of the non-serving cell 210.

For L1/L2-centric mobility, the UE 115-*a* may support a network architecture for standalone (SA) or non-SA (NSA) (for example, using an LTE Pcell and an NR-PSCell) deployments. In some examples, the UE 115-*a* may or may not support intra-band carrier aggregation, intra-RAT operation (such that inter-RAT operation may be excluded if intra-RAT operation is supported), or intra-frequency operation. Intra-frequency operation scenarios may include, for example, scenarios in which synchronization signal blocks (SSBs) of the non-serving cell 210 have a same center frequency and subcarrier-spacing (SCS) as SSBs of the serving cell 205. Additionally, or alternatively, intra-frequency operation scenarios may include scenarios in which an SSB of the non-serving cell 210 is associated with a PCI different from a PCI of the serving cell 205. Further, the UE 115-*a* may support one or both of intra-distributed unit (DU) operation or inter-DU operation.

The reference signal 230 of the non-serving cell 210 may be an example of CSI-RS, an aperiodic CSI-RS (AP-CSI-RS), a tracking reference signal (TRS), an SSB, or any other reference signal that may be transmitted from a serving or non-serving cell. Further, in some examples, the reference signal 230 may be a source reference signal of a TCI state such that a TCI state information element that defines the TCI state lists the reference signal 230 as the source reference signal of a QCL information parameter. In some other examples, the reference signal 230 may be a target reference signal of a TCI state such that the QCL information of the reference signal 230 is associated with the TCI state (as opposed to defining the TCI state).

In some examples, the UE 115-*a* may be mobile and may change physical location, which may result in some cells becoming more or less relevant for the UE 115-*a*. For example, the non-serving cell 210 may become more or less relevant for the UE 115-*a* if the UE 115-*a* moves closer to the non-serving cell 210 or farther away from the non-serving cell 210, respectively. Accordingly, as the UE 115-*a* moves around the UE 115-*a* may update (either according to a UE-decision or according to signaling from the serving cell 205) which non-serving cell reference signals the UE 115-*a* monitors. As a result of an update to which non-serving cell reference signals the UE 115-*a* monitors, the UE 115-*a* and the serving cell 205 also may update the TCI states associated with at least some non-serving cell reference signals.

In some aspects, the serving cell 205 may send an update for a TCI state associated with the serving cell 205 to the UE 115-*a* via a MAC control element (MAC-CE). For non-serving cell reference signals, however, the serving cell 205 may send a list of non-serving cell reference signals for which the UE 115-*a* may monitor (for example, for layer 3 (L3) mobility) via higher layer signaling, such as RRC signaling, and the serving cell 205 and the UE 115-*a* may be constrained to such an RRC signaling-based approach for updating the TCI states associated with the non-serving cell reference signals. As such, an update for a TCI state associated with a non-serving cell reference signal, such as the reference signal 230, may be associated with relatively long latency and large overhead (as the serving cell 205 may transmit such a TCI state update to the UE 115-*a* via a MAC-CE or RRC signaling).

In some implementations, to provide for a lower latency and lower overhead approach for updating TCI states associated with non-serving cell reference signals, the UE 115-*a* and the serving cell 205 may employ a rule for an autonomous and UE-initiated TCI state update in line with the measurements of the non-serving cell reference signals obtained by the UE 115-*a*. In other words, the UE 115-*a* may measure the reference signal 230 sent from the non-serving cell 210 (via a communication link 220) over one or more directional beams 245, which may be associated with a TCI state (such that the TCI state also may be understood as being associated with the reference signal 230), and the UE 115-*a* may update the TCI state associated with the reference signal 230 in line with or according to the measurements. In some aspects, the UE 115-*a* may receive the rule for the autonomous and UE-initiated TCI state update from the serving cell 205. The rule may indicate or otherwise configure one or more threshold conditions for applying the TCI state update (such as a triggering condition for applying the TCI state update, such as one or more L1 metric thresholds), one or more timers associated with applying the TCI state update (and when such timers may be started), or what types of TCI state updates (for example, changing a source reference signal of a TCI state, deactivating a TCI state, or activating a TCI state) the UE 115-*a* may apply, or a combination thereof. Further, in some examples, the serving cell 205 may reconfigure the rule via additional control signaling to the UE 115-*a*.

To support such an autonomous update of the TCI state associated with the reference signal 230, the UE 115-*a* may receive, from the serving cell 205 via a communication link 215-*a*, a configuration 225 to monitor an L1 metric of the reference signal 230 based on or as a result of measuring the reference signal 230. Such an L1 metric may include a reference signal received power (RSRP), such as L1-RSRP, or a signal-to-interference-plus-noise ratio (SINR), such as L1-SINR, and the UE 115-*a* may measure the L1 metric if applying spatial domain filtering, time domain filtering, or no filtering to the L1 metric (for example, the L1 metric may be spatial domain filtered, time domain filtered, or neither). Further, although described herein in the context of an L1 measurement, the UE 115-*a* may additionally, or alternatively, obtain other measurements from the reference signal 230. For example, the UE 115-*a* may measure an L3 metric, such as L3-RSRP. In some examples, the configuration 225 may indicate a time or frequency location for receiving the reference signal 230, a transmission power of the reference signal 230, the TCI state associated with the reference signal 230, or any other information that the UE 115-*a* may use for receiving and measuring the reference signal 230 of the non-serving cell 210 or for inter-cell mobility.

In some implementations, the UE 115-*a* may measure the reference signal 230 over one or more directional beams 245 that are associated with the TCI state and may obtain the L1 metric as a result of measuring the reference signal 230 over the one or more directional beams 245. In other words, the UE 115-*a* and the non-serving cell 210 may (effectively) perform a P2 sweep associated with the TCI state. The UE 115-*a*, as a result of or after measuring the L1 metric of the reference signal 230 according to the configuration 225, may transmit a measurement report 235 including the measured L1 metric to the serving cell 205 via a communication link 215-*b*. As described herein, a P2 sweep may be an example of a beam refinement process within a larger beam management procedure. For example, the UE 115-*a* may select a beam (from the transmitter) during a P1 sweep in which a cell sweeps a relatively wider beam over a relatively wider range, the UE 115-*a* may refine the selected beam during the P2 sweep in which the cell sweeps a relatively narrower beam over a relatively narrower range, and the UE 115-*a* may select a receive beam during a P3 sweep in which the UE 115-*a* sweeps a receive beam while the cell uses the beam selected by the UE 115-*a* during the P2 sweep.

In some examples, the UE 115-*a* may transmit the measurement report 235 if the UE 115-*a* satisfies a triggering condition associated with transmitting the measurement report 235. In other words, for example, the UE 115-*a* may transmit the measurement report 235 if a condition (a threshold condition or a triggering event) is met or satisfied. Such a condition may include a measurement of the L1 metric being above or below a threshold value, among other examples. The UE 115-*a* may receive a configuration of the condition for transmitting the measurement report 235 from the serving cell 205 (such as via the configuration 225) or the condition may be configured at the UE 115-*a* (for example, the condition may be defined by a specification).

Additionally, or alternatively, the UE 115-*a* may transmit the measurement report 235 if the UE 115-*a* receives a request from the serving cell 205. For example, the serving cell 205 may request the measurement report 235 including the L1 metric of the reference signal 230 in an aperiodic manner (such that the measurement report 235 may be understood as an aperiodic report). Alternatively, the serving cell 205 may transmit a request or configuration to the UE 115-*a* requesting or configuring a transmission of the measurement report 235 in a periodic manner (such that the measurement report 235 may be understood or referred to as a periodic report).

The UE 115-*a* may transmit the measurement report 235 to the serving cell 205 over a physical uplink control channel (PUCCH) or a physical uplink shared channel (PUSCH). In some examples in which the UE 115-*a* transmits the measurement report 235 to the serving cell 205 over a PUSCH, the UE 115-*a* may transmit a scheduling request to the serving cell 205 requesting an uplink grant (time and frequency resources for an uplink transmission) over which the UE 115-*a* may transmit the measurement report 235 if the UE 115-*a* does not have a current, existing, or upcoming uplink grant. In some aspects, the UE 115-*a* may receive an uplink grant from the serving cell 205 in response to transmitting the scheduling request and may transmit the measurement report 235 over the received uplink grant. In such aspects, the UE 115-*a* may transmit the measurement report 235 via a MAC-CE. Alternatively, if the UE 115-*a* has a current, existing, or upcoming uplink grant, the UE 115-*a* may refrain from transmitting a scheduling request to the serving cell 205 and may transmit the measurement report 235 over the current, existing, or upcoming uplink grant.

In some implementations, the measurement report 235 may trigger an autonomous update for the TCI state associated with the reference signal 230 at both the UE 115-*a* and the serving cell 205. The UE 115-*a* and the serving cell 205 may identify the update in accordance with the rule for applying the TCI state update sent by the serving cell 205. In some examples, the update for the TCI state associated with the reference signal may include changing a source reference signal of the TCI state. For example, if, as part of the P2 sweep with the non-serving cell 210, the UE 115-*a* measures a first L1 metric for the reference signal 230 that is greater than a second L1 metric of a second reference signal (which may be configured as the source reference signal for the TCI state associated with the reference signal 230), the UE 115-*a* and the serving cell 205 may update the TCI state associated with the reference signal 230 by changing the source reference signal of the TCI state from the second reference signal to the reference signal 230. Such a replacing of the source reference signal for the TCI state may occur if the UE 115-*a* measures or detects that the reference signal 230 becomes a "stronger" reference signal (for example, a reference signal having a greater measured L1 metric) than a current source reference signal associated with the TCI state of the same non-serving cell 210.

Alternatively, if the UE 115-*a* measures a first L1 metric for the reference signal 230 that fails to satisfy a threshold (such as a threshold L1 metric), the UE 115-*a* and the serving cell 205 may deactivate the TCI state associated with the reference signal 230. Similarly, if the UE 115-*a* measures L1 metrics for multiple (for example, all) reference signals transmitted from the non-serving cell 210 that fail to satisfy a threshold (such as a threshold L1 metric), the UE 115-*a* and the serving cell 205 may deactivate the TCI state for the non-serving cell 210. In other words, the UE 115-*a* and the serving cell 205 may deactivate the TCI state for multiple (for example, all) reference signals of the non-serving cell 210. In some aspects, the various thresholds (such as the threshold L1 metric) described herein may be configured by the network via the serving cell 205 or may be configured at the UE 115-*a* (for example, according to a definition in a specification).

Additionally, or alternatively, the measurement report 235 may trigger a change of a candidate non-serving or neighboring cell that the UE 115-*a* may monitor. For example, if the measurement report 235 indicates that reference signals, such as the reference signal 230, from the non-serving cell 210 are measured with an L1 metric that is lower than a threshold, the UE 115-*a* and the serving cell 205 may determine or otherwise identify that the UE 115-*a* has moved sufficiently far away from the non-serving cell 210 and may select new potential candidate non-serving or neighboring cells from which the UE 115-*a* may monitor reference signals. Further, in some examples, the measurement report 235 may trigger a handover to a new cell. For example, if the UE 115-*a* measures that the L1 metric of the reference signal 230 exceeds an L1 metric of a reference signal transmitted from the serving cell 205 (such as a strongest reference signal of the serving cell 205), the UE 115-*a* and the serving cell 205 may trigger a handover procedure to establish a connection between the UE 115-*a* and the non-serving cell 210 (which may accordingly become a serving cell for the UE 115-*a* upon completion of the handover).

The UE 115-*a* and the serving cell 205 may apply the update for the TCI state associated with the reference signal 230 after or within a time duration, which may be referred to herein as an application time, that is measured from the transmission of the measurement report 235 or from a reception of an ACK 240 from the serving cell 205 responsive to the measurement report 235. For example, if the UE 115-*a* does not expect to receive an ACK 240 from the serving cell 205 responsive to the measurement report 235 and if the serving cell 205 likewise does not expect to transmit an ACK 240 to the UE 115-*a* responsive to the measurement report 235, the UE 115-*a* and the serving cell 205-*a* may start a timer having a duration equal to the application time as a result of, upon, or after transmission (from the perspective of the UE 115-*a*) or reception (from the perspective of the serving cell 205) of the measurement report 235. As such, the UE 115-*a* and the serving cell 205 may apply the update for the TCI state associated with the reference signal 230 prior to or after expiration of the timer.

Alternatively, if the UE 115-*a* and the serving cell 205 are configured to communicate an ACK 240 responsive to the measurement report 235, the UE 115-*a* and the serving cell 205 may start the timer having the duration equal to the application timer as a result of, upon, or after reception (from the perspective of the UE 115-*a*) or transmission (from the perspective of the serving cell 205) of the ACK 240. As such, the UE 115-*a* and the serving cell 205 may apply the update for the TCI state associated with the reference signal prior to or after expiration of the timer. In such examples in which the serving cell 205 transmits the ACK 240 responsive to the measurement report 235, the serving cell 205 may transmit the ACK 240 in various ways depending on how the UE 115-*a* transmits the measurement report 235. For example, the serving cell 205 may transmit the ACK 240 via one or more bits in downlink control information (DCI) if the serving cell 205 receives the measurement report 235 over a PUCCH. Alternatively, if the serving cell 205 receives the measurement report 235 over a PUSCH (such as over an uplink grant), the serving cell 205 may transmit the ACK 240 over a feedback occasion that is configured for or otherwise associated with the PUSCH. Further, in such examples in which the serving cell 205 transmits the ACK 240 responsive to the measurement report 235, the UE 115-*a* may start a timer as a result of, upon, or after transmitting the measurement report 235 and may monitor for the ACK 240 for a duration of the timer. Accordingly, if the UE 115-*a* fails to receive the ACK 240 prior to expiration of the timer (which may occur if the serving cell 205 fails to receive the measurement report 235 or if the UE 115-*a* fails to receive the ACK 240), the UE 115-*a* may delay (or refrain from applying) the update for the TCI state associated with the reference signal 230 and, in some implementations, may retransmit the measurement report 235.

The application time, regardless of whether measured from the time the UE 115-*a* transmits the measurement report 235 or from the time the UE 115-*a* receives the ACK 240 responsive to the measurement report 235, may be configured or signaled in various ways. In some implementations, for example, the UE 115-*a* may support a minimum or lower limit value for the application time (which may be equivalently referred to as a beam application time) and may signal the minimum or lower limit value for the application time to the serving cell 205 (for example, as a UE capability and via UE capability signaling). In some aspects, the UE 115-*a* may be capable of such a minimum or lower limit value for the application time if the UE 115-*a* has a capability that defines or is associated with a time duration it may take for the UE 115-*a* to apply the update for the TCI state at the UE 115-*a* (for example, based on or in line with a processing timeline at the UE 115-*a* for applying the TCI state update). In such implementations, the serving cell 205 may configure the application time such that the application time is greater than or equal to the minimum or lower limit value provided by the UE 115-*a* and may transmit an indication of the application time to the UE 115-*a*.

In some other implementations, the serving cell 205 may configure (and signal to the UE 115-*a*) the application time such that the application time is greater than or equal to a minimum or lower limit value of the application time configured at the UE 115-*a* and the serving cell 205. For example, the minimum or lower limit value of the application time may be defined in a specification and the serving cell 205 may configure the application time to be greater than or equal to such a specification-defined minimum or lower limit application time. In some other implementations, the application time may be configured at the UE 115-*a* and the serving cell 205. For example, the application time be defined in a specification.

Although the serving cell 205 may configure the application time to any value without exceeding the scope of the present disclosure, the serving cell may sometimes calculate the application time according to a function of a tone spacing of one or more component carriers used for communication between the UE 115-*a* and the serving cell 205. For example, the application time may be a function of a tone spacing of a least one of a component carrier associated with (such as impacted by or that applies) the update for the TCI state associated with the reference signal 230, a component carrier over which the UE 115-*a* transmits the measurement report 235, and a component carrier over which the UE 115-*a* receives the ACK 240, if such component carriers are different or unique. In some aspects, the tone spacing may influence the application time because the tone spacing may define or be associated with a symbol period length of a slot, which may influence processing and decoding operations or timelines at the UE 115-*a*. In some implementations, for example, the serving cell may derive or calculate the application time from or using a minimum or lowest tone spacing of such component carriers because the minimum or lowest tone spacing may be associated with a longest duration symbol period.

The UE 115-*a* and the serving cell 205, as a result of employing a common application time that is defined from a mutually known starting point, may synchronously apply the update for the TCI state associated with the reference signal 230. As such, the UE 115-*a* and the serving cell 205 may avoid scenarios in which one of the devices, but not both, applies the update, which may lead to inaccuracies and incongruities between the UE 115-*a* and the serving cell 205 that may adversely impact the performance of any beam refinement or beam management procedure performed by the UE 115-*a*. Further, such an autonomous and report-based update for the TCI state associated with the reference signal at both the UE 115-*a* and the serving cell 205 may save overhead and reduce latency associated with TCI state updates for non-serving cell reference signals, which may provide more accurate and dynamic inter-cell mobility and increase overall system reliability and performance.

In some examples, the serving cell 205 may transmit a message, such as a control message, to the UE 115-*a* confirming the autonomous update for the TCI state associated with the reference signal 230 of the non-serving cell 210. In such examples, the serving cell 205 may transmit the message including a TCI-state information element that defines at least a tci-StateId parameter, a qcl-Type1 parameter, or a qcl-Type2 parameter, or a combination thereof. Each of the qcl-Type1 parameter and the qcl-Type2 parameter may be further defined according to at least a QCL-info parameter (which may include a serving cell index via a ServCellIndex parameter), and BWP-Id parameter, a referenceSignal parameter that indicates a reference signal (such as a CSI-RS, a non-zero power CSI-RS (NZP-CSI-RS), or an SSB), or a qcl-Type parameter indicating one of typeA, typeB, typeC, or typeD, or a combination thereof. In examples in which the message conveys information about the TCI state update for the reference signal 230 of the non-serving cell 210, the message may additionally include a non-serving cell ID of the non-serving cell 210 in the TCI-state information element and, in examples in which the reference signal 230 is updated to be a source reference signal for the TCI state, the message may replace a previous source reference signal for the TCI state with the reference signal 230 via the referenceSignal parameter in the QCL-Info. The serving cell 205 may transmit such a message via RRC signaling, in a MAC-CE, or via DCI messaging.

Figure 3:
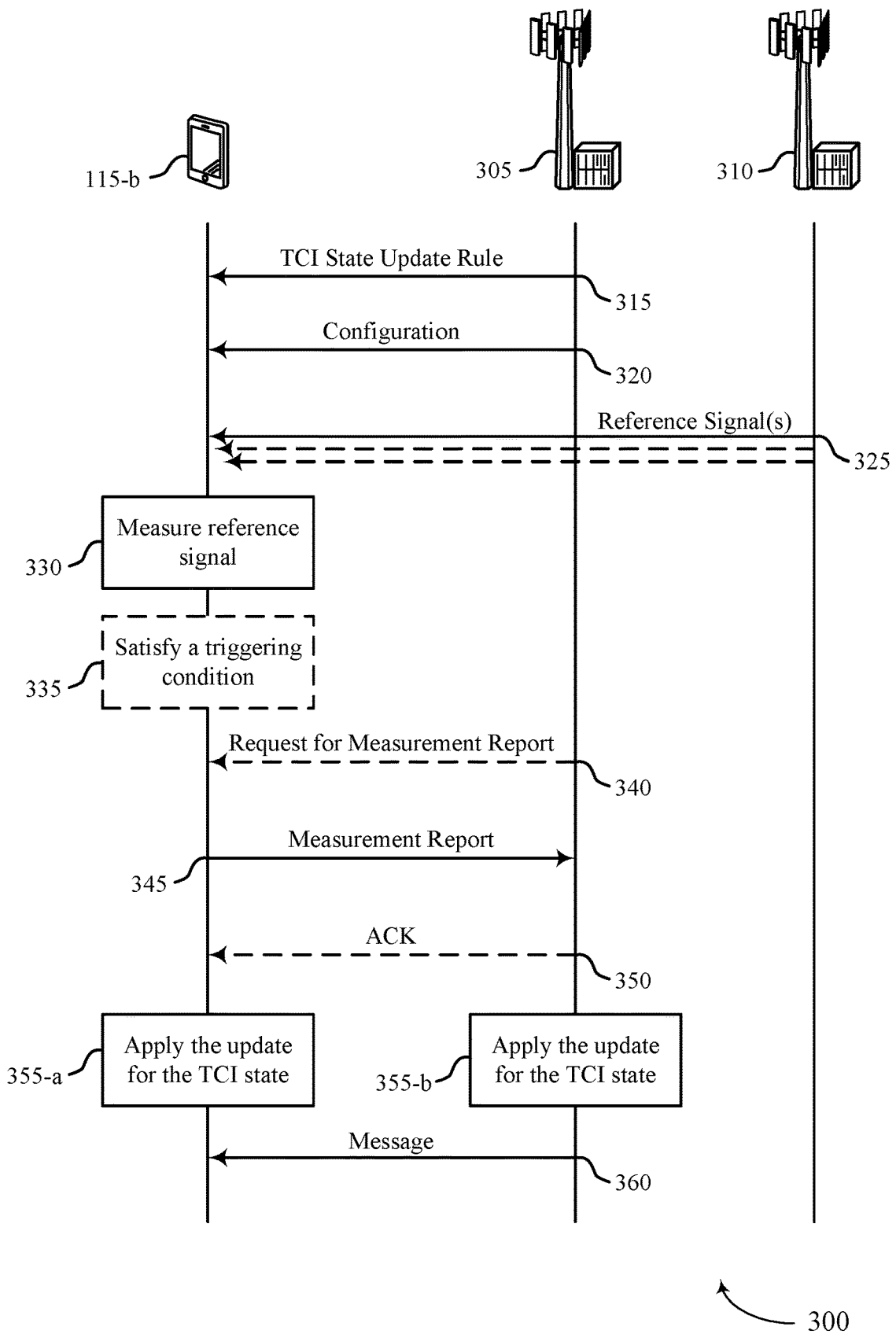
FIG. 3 illustrates an example of a process flow that supports techniques for autonomously updating a TCI state associated with a non-serving cell reference signal.

FIG. 3 illustrates an example of a process flow 300 that supports techniques for autonomously updating a TCI state associated with a non-serving cell reference signal. The process flow 300 may implement or be implemented to realize aspects of the wireless communications system 100 or the signaling diagram 200. For example, the process flow 300 may illustrate communication between a UE 115-*b*, a serving cell 305, and a non-serving cell 310, which may be examples of corresponding devices described herein, including with reference to FIGS. 1 and 2. In some examples, the UE 115-*b* and the serving cell 305 may autonomously apply an update for a TCI state associated with a reference signal of the non-serving cell 310 (which may be referred to herein as a non-serving cell reference signal) in line with a measurement and reporting framework and a mutually understood rule for how such a TCI state update may be applied.

In the following description of the process flow 300, the operations may be performed (for example, reported or provided) in a different order than the order shown. Specific operations also may be left out of the process flow 300, or other operations may be added to the process flow 300. Further, although some operations or signaling may be shown to occur at different times for discussion purposes, these operations may actually occur at the same time.

At 315, the UE 115-*b* may receive, from the serving cell 305, a rule for applying the update for the TCI state associated with the reference signal of the non-serving cell 310. In some examples, the rule for applying the update for the TCI state associated with the reference signal of the non-serving cell 310 may indicate or otherwise configure a condition for applying the TCI state update or an application time for applying the TCI state update (and from when such an application time may be measured), among other rules or configurations that may support synchronous TCI state updates across both the UE 115-*b* and the serving cell 305.

At 320, the UE 115-*b* may receive, from the serving cell 305, a configuration for the UE 115-*b* to measure the reference signal of the non-serving cell 310. Such a configuration may indicate or otherwise configure how the UE 115-*b* may search for the reference signal of the non-serving cell 310 (such as a beam direction, a TCI state, QCL information, a resource allocation, or a transmission power, among other examples). Additionally, or alternatively, the configuration may indicate a metric, such as an L1 metric (for example, an RSRP or an SINR), for the UE 115-*a* to measure using the reference signal.

At 325, the UE 115-*b* may receive the reference signal from the non-serving cell 310 according to the configuration. In some examples, the UE 115-*b* may receive multiple reference signals from the non-serving cell 310 according to the configuration.

At 330, the UE 115-*b* may measure the reference signal (or the multiple reference signals) of the non-serving cell 310 according to the configuration. In some examples, the UE 115-*b* may measure an L1 metric, such as an RSRP or an SINR, of the reference signal (or of the multiple reference signals) of the non-serving cell 310. In some aspects, the UE 115-*b* may measure the L1 metric if applying spatial domain filtering, time domain filtering, or neither to the L1 metric.

At 335, the UE 115-*b* may, in some implementations, satisfy a triggering condition associated with transmitting a measurement report including the L1 metric of the reference signal of the non-serving cell 310. In some examples, the UE 115-*b* may receive a configuration of the triggering condition from the serving cell 305. In some other examples, the UE 115-*b* may be configured with the triggering condition.

At 340, the UE 115-*b* may, in some implementations, receive, from the serving cell 305, a request for the measurement report. For example, the serving cell 305 may request the measurement report from the UE 115-*b* in a periodic or aperiodic manner.

At 345, the UE 115-*b* may transmit the measurement report to the serving cell 305, the measurement report including the measurements of the reference signal obtained from measuring the reference signal at 330. In some examples, the UE 115-*b* may transmit the measurement report if the UE 115-*b* satisfies the triggering condition at 335 or receives the request for the measurement report at 340, or both. The measurement repot may include the L1 metric of the reference signal and, in some implementations, may trigger the update for the TCI state associated with the reference signal of the non-serving cell 310.

At 350, the UE 115-*b* may, in some implementations, receive an ACK from the serving cell 305 responsive to the measurement report transmitted at 345. In some examples, the ACK may indicate a successful reception of the measurement report at the serving cell 305.

At 355-*a*, the UE 115-*b* may apply the update for the TCI state associated with the reference signal upon or after transmitting the measurement report. In some examples, the UE 115-*b* may apply the update for the TCI state associated with the reference signal prior to or after an expiration of a timer started upon transmission of the measurement report at 345. In some other examples, the UE 115-*b* may apply the update for the TCI state associated with the reference signal prior to or after an expiration of a timer started upon reception of the ACK at 350.

At 355-*b*, the serving cell 305 may apply the update for the TCI state associated with the reference signal upon or after receiving the measurement report. In some examples, the serving cell 305 may apply the update for the TCI state associated with the reference signal prior to or after an expiration of a timer started upon reception of the measurement report at 345. In some other examples, the serving cell 305 may apply the update for the TCI state associated with the reference signal prior to or after an expiration of a timer started upon transmission of the ACK at 350.

In some aspects, such a timer may be set for a duration of an application time, as described in more detail with reference to FIG. 2. Further, the update for the TCI state associated with the reference signal may include a changing of a source reference signal for the TCI state, a deactivation of the TCI state for the reference signal, a deactivation of the TCI state for the non-serving cell 310, or an activation of the TCI state. Additional details relating to such TCI state updates are described herein, including with reference to FIG. 2.

At 360, the UE 115-*b* may receive a message (such as a control message) indicating the update for the TCI state associated with the reference signal of the non-serving cell 310. In some examples, the message may include an indication (such as an ID) of the reference signal of the non-serving cell 310 (such as a CSI-RS or an SSB ID), an indication of a cell ID associated with the non-serving cell 310, and QCL information associated with the TCI state. In some aspects, the message may be an example of a MAC-CE, an RRC message, or DCI (such as a DCI message). For example, the message may include or be an example of a TCI-State information element that is formatted for nonserving cells. In some implementations, such a message may serve to confirm the applied update for the TCI state associated with the reference signal of the non-serving cell 310.

Figure 4:
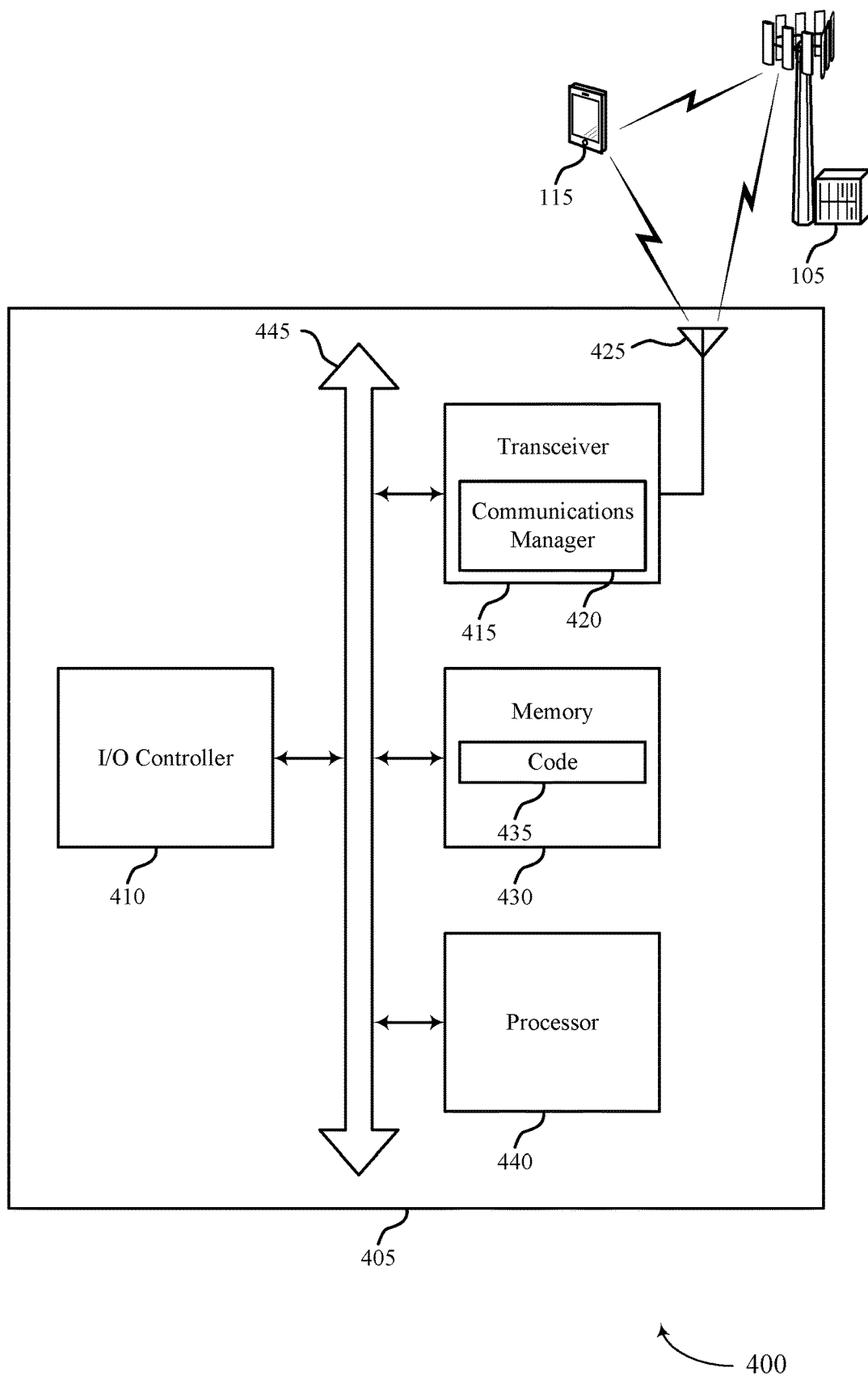
FIGS. 4 and 5 show block diagrams of example devices that support techniques for autonomously updating a TCI state associated with a non-serving cell reference signal.

FIG. 4 shows a block diagram 400 of an example device 405 that supports techniques for autonomously updating a TCI state associated with a non-serving cell reference signal. The device 405 may communicate wirelessly with one or more BSs 105, UEs 115, or any combination thereof. The device 405 may include components for bi-directional voice and data communications including components for transmitting and receiving communications, such as a communications manager 420, an input/output (I/O) controller 410, a transceiver 415, an antenna 425, a memory 430, code 435, and a processor 440. These components may be in electronic communication or otherwise coupled (for example, operatively, communicatively, functionally, electronically, electrically) via one or more buses (for example, a bus 445).

The I/O controller 410 may manage input and output signals for the device 405. The I/O controller 410 also may manage peripherals not integrated into the device 405. In some implementations, the I/O controller 410 may represent a physical connection or port to an external peripheral. In some implementations, the I/O controller 410 may utilize an operating system such as iOS®, ANDROID®, MS-DOS®, MS-WINDOWS®, OS/2®, UNIX®, LINUX®, or another known operating system. Additionally, or alternatively, the I/O controller 410 may represent or interact with a modem, a keyboard, a mouse, a touchscreen, or a similar device. In some implementations, the I/O controller 410 may be implemented as part of a processor, such as the processor 440. In some implementations, a user may interact with the device 405 via the I/O controller 410 or via hardware components controlled by the I/O controller 410.

In some implementations, the device 405 may include a single antenna 425. However, in some other implementations, the device 405 may have more than one antenna 425, which may be capable of concurrently transmitting or receiving multiple wireless transmissions. The transceiver 415 may communicate bi-directionally, via the one or more antennas 425, wired, or wireless links as described herein. For example, the transceiver 415 may represent a wireless transceiver and may communicate bi-directionally with another wireless transceiver. The transceiver 415 also may include a modem to modulate the packets, to provide the modulated packets to one or more antennas 425 for transmission, and to demodulate packets received from the one or more antennas 425.

The memory 430 may include random access memory (RAM) and read-only memory (ROM). The memory 430 may store computer-readable, computer-executable code 435 including instructions that, when executed by the processor 440, cause the device 405 to perform various functions described herein. The code 435 may be stored in a non-transitory computer-readable medium such as system memory or another type of memory. In some implementations, the code 435 may not be directly executable by the processor 440 but may cause a computer (for example, when compiled and executed) to perform functions described herein. In some implementations, the memory 430 may contain, among other things, a basic I/O system (BIOS) which may control basic hardware or software operation such as the interaction with peripheral components or devices.

The processor 440 may be any one or more suitable processors capable of executing scripts or instructions of one or more software programs stored in the device 405 (such as within the memory 430). In some implementations, the processor 440 may be a component of a processing system. A processing system may generally refer to a system or series of machines or components that receives inputs and processes the inputs to produce a set of outputs (which may be passed to other systems or components of, for example, the device 405). For example, a processing system of the device 405 may refer to a system including the various other components or subcomponents of the device 405.

The processing system of the device 405 may interface with other components of the device 405, and may process information received from other components (such as inputs or signals) or output information to other components. For example, a chip or modem of the device 405 may include a processing system, a first interface to output information, and a second interface to obtain information. In some implementations, the first interface may refer to an interface between the processing system of the chip or modem and a transmitter, such that the device 405 may transmit information output from the chip or modem. In some implementations, the second interface may refer to an interface between the processing system of the chip or modem and a receiver, such that the device 405 may obtain information or signal inputs, and the information may be passed to the processing system. A person having ordinary skill in the art will readily recognize that the first interface also may obtain information or signal inputs, and the second interface also may output information or signal outputs.

The communications manager 420 may support wireless communication at a UE in accordance with examples as disclosed herein. For example, the communications manager 420 may be configured as or otherwise support a means for receiving, from a serving cell, a configuration for the UE to measure a reference signal of a non-serving cell. The communications manager 420 may be configured as or otherwise support a means for measuring the reference signal of the non-serving cell based on the configuration. The communications manager 420 may be configured as or otherwise support a means for transmitting a measurement report to the serving cell based on measuring the reference signal, where transmitting the measurement report triggers an update for a TCI state associated with the reference signal of the non-serving cell. The communications manager 420 may be configured as or otherwise support a means for applying the update for the TCI state associated with the reference signal based on transmitting the measurement report.

In some examples, the communications manager 420 may be configured as or otherwise support a means for receiving, from the serving cell, a rule for applying the update for the TCI state associated with the reference signal, where applying the update for the TCI state associated with the reference signal is based on the rule for applying the update for the TCI state associated with the reference signal.

In some examples, measuring the reference signal of the non-serving cell includes measuring a first metric associated with the reference signal greater than a second metric associated with a second reference signal, the second reference signal being a source reference signal of the TCI state. In some examples, applying the update for the TCI state associated with the reference signal includes changing the source reference signal of the TCI state from the second reference signal to the reference signal, where the reference signal and the second reference signal are both of the non-serving cell.

In some examples, measuring the reference signal of the non-serving cell includes measuring a first metric associated with the reference signal that fails to satisfy a threshold. In some examples, applying the update for the TCI state associated with the reference signal includes deactivating the TCI state associated with the reference signal of the non-serving cell based on the first metric associated with the reference signal failing to satisfy the threshold.

In some examples, the communications manager 420 may be configured as or otherwise support a means for measuring a set of multiple reference signals of the non-serving cell, each of the set of multiple reference signals of the non-serving cell being measured with a metric that fails to satisfy a threshold, where the non-serving cell is associated with the TCI state. In some examples, the communications manager 420 may be configured as or otherwise support a means for deactivating the TCI state associated with the non-serving cell based on each of the set of multiple reference signals of the non-serving cell being measured with the metric that fails to satisfy the threshold.

In some examples, the communications manager 420 may be configured as or otherwise support a means for starting a timer based on transmitting the measurement report or receiving an ACK responsive to the measurement report from the serving cell, where the update for the TCI state associated with the reference signal is applied prior to an expiration of the timer.

In some examples, the communications manager 420 may be configured as or otherwise support a means for transmitting, to the serving cell, an indication of a lower limit of the timer based on a capability of the UE. In some examples, the communications manager 420 may be configured as or otherwise support a means for receiving, from the serving cell, an indication of the timer, the timer being greater than or equal to the lower limit. In some examples, the timer is configured at the UE. In some examples, the communications manager 420 may be configured as or otherwise support a means for receiving, from the serving cell, an indication of the timer, the timer being greater than or equal to a configured lower limit. In some examples, a duration of the timer is based on a tone spacing of one or more component carriers used for communication between the UE and the serving cell.

In some examples, the communications manager 420 may be configured as or otherwise support a means for satisfying a triggering condition associated with the measurement report, where transmitting the measurement report is based on satisfying the triggering condition. In some examples, the communications manager 420 may be configured as or otherwise support a means for receiving, from the serving cell, a configuration of the triggering condition associated with the measurement report. In some examples, the communications manager 420 may be configured as or otherwise support a means for receiving, from the serving cell, a request for the measurement report, where transmitting the measurement report is based on receiving the request.

In some examples, to support transmitting the measurement report, the communications manager 420 may be configured as or otherwise support a means for transmitting the measurement report over a PUCCH or an PUSCH. In some examples, the communications manager 420 may be configured as or otherwise support a means for receiving, from the serving cell, an ACK responsive to the measurement report, the ACK indicating a successful reception of the measurement report at the serving cell.

In some examples, the communications manager 420 may be configured as or otherwise support a means for starting a timer based on transmitting the measurement report. In some examples, the communications manager 420 may be configured as or otherwise support a means for monitoring for the ACK responsive to the measurement report for a duration of the timer.

In some examples, to support measuring the reference signal of the non-serving cell, the communications manager 420 may be configured as or otherwise support a means for measuring an L1 metric of the reference signal, where the L1 metric includes an RSRP or an SINR, the measurement report including the L1 metric. In some examples, measuring the L1 metric includes applying spatial domain filtering or time domain filtering to the L1 metric.

In some examples, the communications manager 420 may be configured to perform various operations (for example, receiving, monitoring, transmitting) using or otherwise in cooperation with the transceiver 415, the one or more antennas 425, or any combination thereof. Although the communications manager 420 is illustrated as a separate component, in some examples, one or more functions described with reference to the communications manager 420 may be supported by or performed by the processor 440, the memory 430, the code 435, or any combination thereof. For example, the code 435 may include instructions executable by the processor 440 to cause the device 405 to perform various aspects of techniques for autonomously updating a TCI state associated with a non-serving cell reference signal as described herein, or the processor 440 and the memory 430 may be otherwise configured to perform or support such operations.

Figure 5:
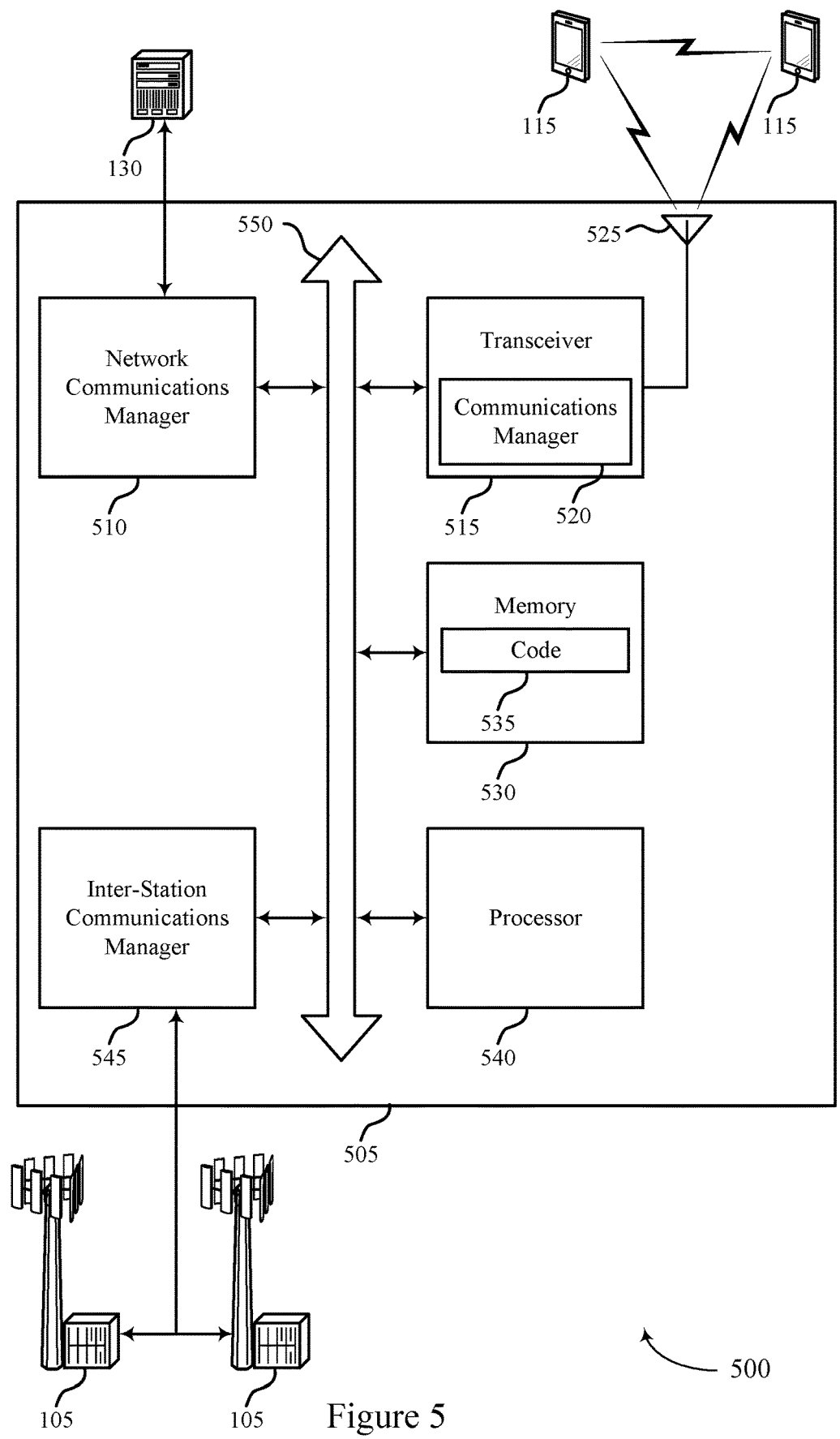

FIG. 5 shows a block diagram 500 of an example device 505 that supports techniques for autonomously updating a TCI state associated with a non-serving cell reference signal. The device 505 may communicate wirelessly with one or more BSs 105, UEs 115, or any combination thereof. The device 505 may include components for bi-directional voice and data communications including components for transmitting and receiving communications, such as a communications manager 520, a network communications manager 510, a transceiver 515, an antenna 525, a memory 530, code 535, a processor 540, and an inter-station communications manager 545. These components may be in electronic communication or otherwise coupled (for example, operatively, communicatively, functionally, electronically, electrically) via one or more buses (for example, a bus 550).

The network communications manager 510 may manage communications with a core network 130 (for example, via one or more wired backhaul links). For example, the network communications manager 510 may manage the transfer of data communications for client devices, such as one or more UEs 115.

In some implementations, the device 505 may include a single antenna 525. However, in some other implementations, the device 505 may have more than one antenna 525, which may be capable of concurrently transmitting or receiving multiple wireless transmissions. The transceiver 515 may communicate bi-directionally, via the one or more antennas 525, wired, or wireless links as described herein. For example, the transceiver 515 may represent a wireless transceiver and may communicate bi-directionally with another wireless transceiver. The transceiver 515 also may include a modem to modulate the packets, to provide the modulated packets to one or more antennas 525 for transmission, and to demodulate packets received from the one or more antennas 525.

The memory 530 may include RAM and ROM. The memory 530 may store computer-readable, computer-executable code 535 including instructions that, when executed by the processor 540, cause the device 505 to perform various functions described herein. The code 535 may be stored in a non-transitory computer-readable medium such as system memory or another type of memory. In some implementations, the code 535 may not be directly executable by the processor 540 but may cause a computer (for example, when compiled and executed) to perform functions described herein. In some implementations, the memory 530 may contain, among other things, a BIOS which may control basic hardware or software operation such as the interaction with peripheral components or devices.

The inter-station communications manager 545 may manage communications with other BSs 105, and may include a controller or scheduler for controlling communications with UEs 115 in cooperation with other BSs 105. For example, the inter-station communications manager 545 may coordinate scheduling for transmissions to UEs 115 for various interference mitigation techniques such as beamforming or joint transmission. In some examples, the inter-station communications manager 545 may provide an X2 interface within an LTE/LTE-A wireless communications network technology to provide communication between BSs 105.

The processor 540 may be any one or more suitable processors capable of executing scripts or instructions of one or more software programs stored in the device 505 (such as within the memory 530). In some implementations, the processor 540 may be a component of a processing system. A processing system may generally refer to a system or series of machines or components that receives inputs and processes the inputs to produce a set of outputs (which may be passed to other systems or components of, for example, the device 505). For example, a processing system of the device 505 may refer to a system including the various other components or subcomponents of the device 505.

The processing system of the device 505 may interface with other components of the device 505, and may process information received from other components (such as inputs or signals) or output information to other components. For example, a chip or modem of the device 505 may include a processing system, a first interface to output information, and a second interface to obtain information. In some implementations, the first interface may refer to an interface between the processing system of the chip or modem and a transmitter, such that the device 505 may transmit information output from the chip or modem. In some implementations, the second interface may refer to an interface between the processing system of the chip or modem and a receiver, such that the device 505 may obtain information or signal inputs, and the information may be passed to the processing system. A person having ordinary skill in the art will readily recognize that the first interface also may obtain information or signal inputs, and the second interface also may output information or signal outputs.

The communications manager 520 may support wireless communication at a BS in accordance with examples as disclosed herein. For example, the communications manager 520 may be configured as or otherwise support a means for transmitting, to a UE, a configuration for the UE to measure a reference signal of a non-serving cell. The communications manager 520 may be configured as or otherwise support a means for receiving a measurement report from the UE based on the configuration of the reference signal, where receiving the measurement report triggers an update for a TCI state associated with the reference signal of the non-serving cell. The communications manager 520 may be configured as or otherwise support a means for applying the update for the TCI state associated with the reference signal based on receiving the measurement report.

In some examples, the communications manager 520 may be configured as or otherwise support a means for transmitting, to the UE, a rule for applying the update for the TCI state associated with the reference signal, where applying the update for the TCI state associated with the reference signal is based on the rule for applying the update for the TCI state associated with the reference signal.

In some examples, receiving the measurement report includes receiving an indication that a first metric associated with the reference signal is greater than a second metric associated with a second reference signal, the second reference signal being a source reference signal of the TCI state. In some examples, applying the update to the TCI state associated with the reference signal includes changing the source reference signal of the TCI state from the second reference signal to the reference signal, where the reference signal and the second reference signal are both of the non-serving cell.

In some examples, receiving the measurement report includes receiving an indication that a first metric associated with the reference signal fails to satisfy a threshold. In some examples, applying the update for the TCI state associated with the reference signal includes deactivating the TCI state associated with the reference signal of the non-serving cell based on the first metric associated with the reference signal failing to satisfy the threshold.

In some examples, the communications manager 520 may be configured as or otherwise support a means for starting a timer based on receiving the measurement report or transmitting an ACK responsive to the measurement report to the UE, where the update for the TCI state associated with the reference signal is applied prior to an expiration of the timer.

In some examples, the communications manager 520 may be configured as or otherwise support a means for transmitting, to the UE, a configuration of a triggering condition associated with the measurement report, where receiving the measurement report from the UE is based on transmitting the triggering condition to the UE. In some examples, the communications manager 520 may be configured as or otherwise support a means for transmitting, to the UE, a request for the measurement report, where receiving the measurement report from the UE is based on transmitting the request for the measurement report to the UE.

In some examples, the communications manager 520 may be configured as or otherwise support a means for transmitting, to the UE, an ACK responsive to the measurement report, the ACK indicating a successful reception of the measurement report at the BS. In some examples, to support receiving the measurement report from the UE, the communications manager 520 may be configured as or otherwise support a means for receiving an indication of an L1 metric of the reference signal, where the L1 metric includes an RSRP or an SINR. In some examples, the communications manager 520 may be configured as or otherwise support a means for transmitting, to the UE, a message indicating the update for the TCI state associated with the reference signal of the non-serving cell, where the message includes an indication of the reference signal of the non-serving cell, an indication of a cell ID associated with the non-serving cell, and QCL information associated with the TCI state.

In some examples, the communications manager 520 may be configured to perform various operations (for example, receiving, monitoring, transmitting) using or otherwise in cooperation with the transceiver 515, the one or more antennas 525, or any combination thereof. Although the communications manager 520 is illustrated as a separate component, in some examples, one or more functions described with reference to the communications manager 520 may be supported by or performed by the processor 540, the memory 530, the code 535, or any combination thereof. For example, the code 535 may include instructions executable by the processor 540 to cause the device 505 to perform various aspects of techniques for autonomously updating a TCI state associated with a non-serving cell reference signal as described herein, or the processor 540 and the memory 530 may be otherwise configured to perform or support such operations.

Figure 6:
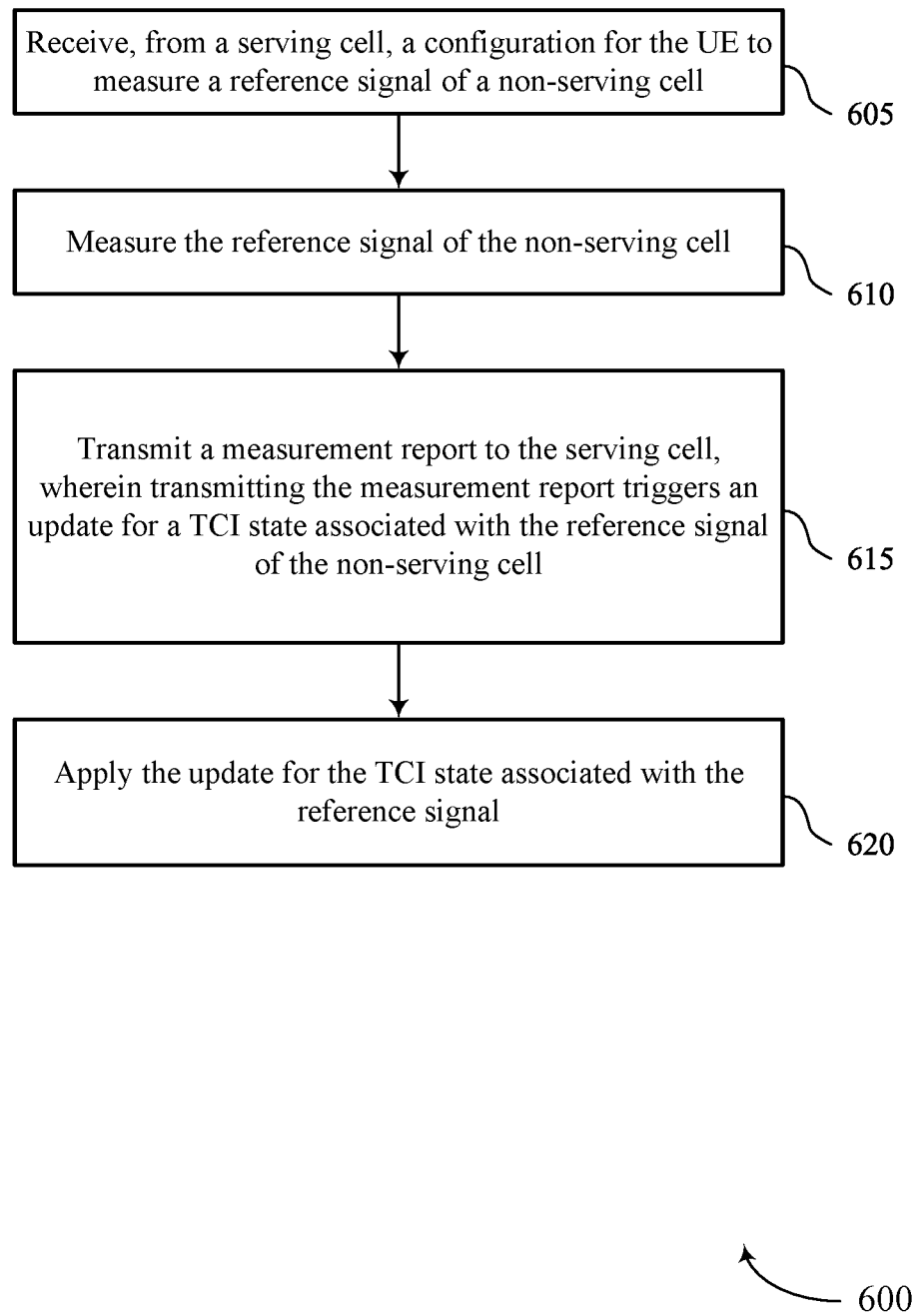
FIGS. 6 and 7 show flowcharts illustrating methods that support techniques for autonomously updating a TCI state associated with a non-serving cell reference signal.

FIG. 6 shows a flowchart illustrating a method 600 that supports techniques for autonomously updating a TCI state associated with a non-serving cell reference signal. The operations of the method 600 may be implemented by a UE or its components as described herein. For example, the operations of the method 600 may be performed by a UE 115 as described with reference to FIGS. 1-4. In some examples, a UE may execute a set of instructions to control the functional elements of the UE to perform the described functions. Additionally, or alternatively, the UE may perform aspects of the described functions using special-purpose hardware.

At 605, the method may include receiving, from a serving cell, a configuration for the UE to measure a reference signal of a non-serving cell. In some examples, aspects of the operations of 605 may be performed by a communications manager 420 as described with reference to FIG. 4.

At 610, the method may include measuring the reference signal of the non-serving cell. In some examples, aspects of the operations of 610 may be performed by a communications manager 420 as described with reference to FIG. 4.

At 615, the method may include transmitting a measurement report to the serving cell, where transmitting the measurement report triggers an update for a TCI state associated with the reference signal of the non-serving cell. In some examples, aspects of the operations of 615 may be performed by a communications manager 420 as described with reference to FIG. 4.

At 620, the method may include applying the update for the TCI state associated with the reference signal. In some examples, aspects of the operations of 620 may be performed by a communications manager 420 as described with reference to FIG. 4.

Figure 7:
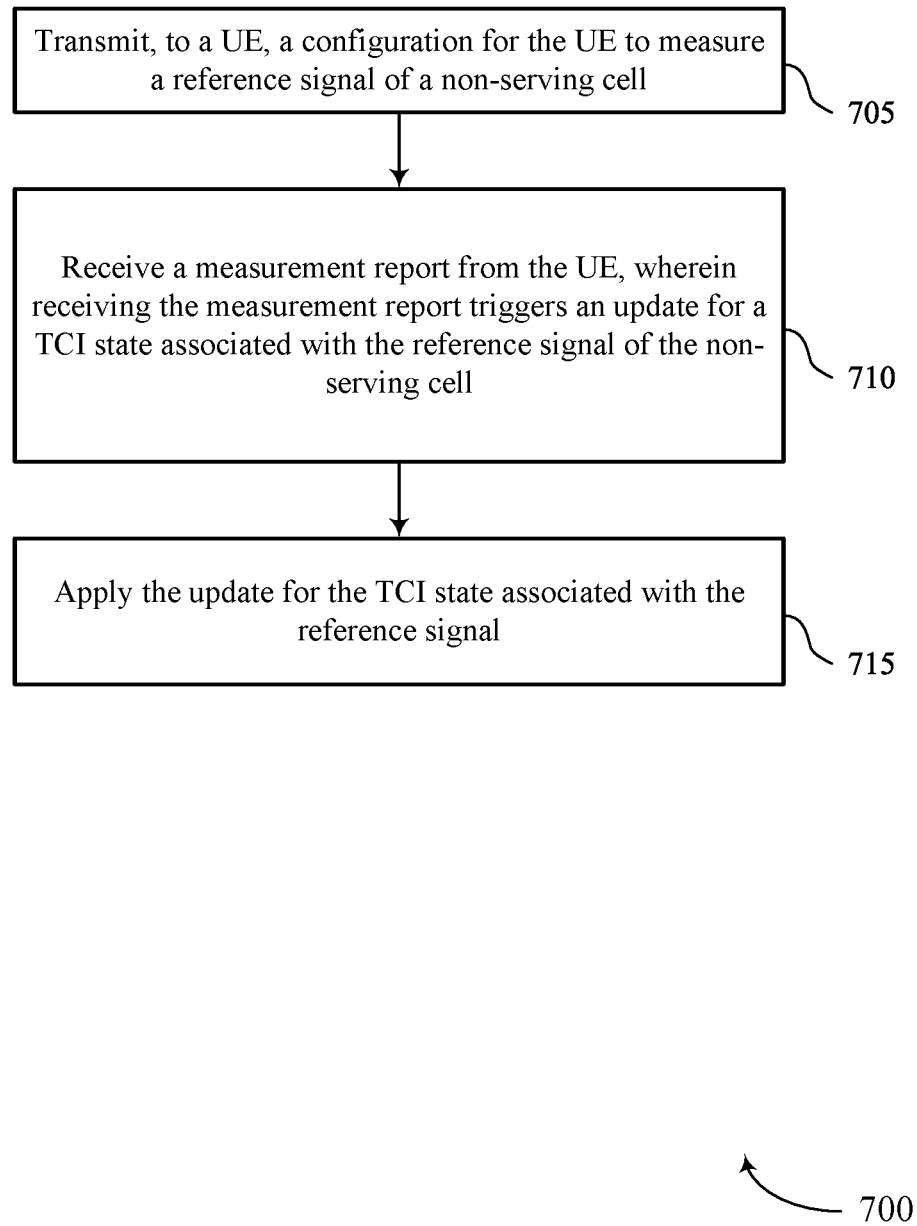

FIG. 7 shows a flowchart illustrating a method 700 that supports techniques for autonomously updating a TCI state associated with a non-serving cell reference signal. The operations of the method 700 may be implemented by a BS or its components as described herein. For example, the operations of the method 700 may be performed by a BS 105 as described with reference to FIGS. 1-3 and 5. In some examples, a BS may execute a set of instructions to control the functional elements of the BS to perform the described functions. Additionally, or alternatively, the BS may perform aspects of the described functions using special-purpose hardware.

At 705, the method may include transmitting, to a UE, a configuration for the UE to measure a reference signal of a non-serving cell. In some examples, aspects of the operations of 705 may be performed by a communications manager 520 as described with reference to FIG. 5.

At 710, the method may include receiving a measurement report from the UE, where receiving the measurement report triggers an update for a TCI state associated with the reference signal of the non-serving cell. In some examples, aspects of the operations of 710 may be performed by a communications manager 520 as described with reference to FIG. 5.

At 715, the method may include applying the update for the TCI state associated with the reference signal. In some examples, aspects of the operations of 715 may be performed by a communications manager 520 as described with reference to FIG. 5.

The following provides an overview of some aspects of the present disclosure:

Aspect 1: A method for wireless communication at a UE, including: receiving, from a serving cell, a configuration for the UE to measure a reference signal of a non-serving cell; measuring the reference signal of the non-serving cell; transmitting a measurement report to the serving cell, where transmitting the measurement report triggers an update for a TCI state associated with the reference signal of the non-serving cell; and applying the update for the TCI state associated with the reference signal.

Aspect 2: The method of aspect 1, further including: receiving, from the serving cell, a rule for applying the update for the TCI state associated with the reference signal, where applying the update for the TCI state associated with the reference signal is based at least in part on the rule for applying the update for the TCI state associated with the reference signal.

Aspect 3: The method of any of aspects 1 or 2, where measuring the reference signal of the non-serving cell includes measuring a first metric associated with the reference signal greater than a second metric associated with a second reference signal, the second reference signal being a source reference signal of the TCI state; and applying the update for the TCI state associated with the reference signal includes changing the source reference signal of the TCI state from the second reference signal to the reference signal, where the reference signal and the second reference signal are both of the non-serving cell.

Aspect 4: The method of any of aspects 1 or 2, where measuring the reference signal of the non-serving cell includes measuring a first metric associated with the reference signal that fails to satisfy a threshold; and applying the update for the TCI state associated with the reference signal includes deactivating the TCI state associated with the reference signal of the non-serving cell based at least in part on the first metric associated with the reference signal failing to satisfy the threshold.

Aspect 5: The method of any of aspects 1, 2, or 4, further including: measuring a plurality of reference signals of the non-serving cell, each of the plurality of reference signals of the non-serving cell being measured with a metric that fails to satisfy a threshold, where the non-serving cell is associated with the TCI state; and deactivating the TCI state associated with the non-serving cell based at least in part on each of the plurality of reference signals of the non-serving cell being measured with the metric that fails to satisfy the threshold.

Aspect 6: The method of any of aspects 1-5, further including: starting a timer based at least in part on transmitting the measurement report or receiving an ACK responsive to the measurement report from the serving cell, where the update for the TCI state associated with the reference signal is applied prior to an expiration of the timer.

Aspect 7: The method of aspect 6, further including: transmitting, to the serving cell, an indication of a lower limit of the timer based at least in part on a capability of the UE; and receiving, from the serving cell, an indication of the timer, the timer being greater than or equal to the lower limit.

Aspect 8: The method of any of aspects 6 or 7, where the timer is configured at the UE.

Aspect 9: The method of any of aspects 6-8, further including: receiving, from the serving cell, an indication of the timer, the timer being greater than or equal to a configured lower limit.

Aspect 10: The method of any of aspects 6-9, where a duration of the timer is based at least in part on a tone spacing of one or more component carriers used for communication between the UE and the serving cell.

Aspect 11: The method of any of aspects 1-10, further including: satisfying a triggering condition associated with the measurement report, where transmitting the measurement report is based at least in part on satisfying the triggering condition.

Aspect 12: The method of aspect 11, further including: receiving, from the serving cell, a configuration of the triggering condition associated with the measurement report.

Aspect 13: The method of any of aspects 1-12, further including: receiving, from the serving cell, a request for the measurement report, where transmitting the measurement report is based at least in part on receiving the request.

Aspect 14: The method of any of aspects 1-13, where transmitting the measurement report includes: transmitting the measurement report over a PUCCH or an PUSCH.

Aspect 15: The method of any of aspects 1-14, further including: receiving, from the serving cell, an ACK responsive to the measurement report, the ACK indicating a successful reception of the measurement report at the serving cell.

Aspect 16: The method of aspect 15, further including: starting a timer based at least in part on transmitting the measurement report; and monitoring for the ACK responsive to the measurement report for a duration of the timer.

Aspect 17: The method of any of aspects 1-16, where measuring the reference signal of the non-serving cell includes: measuring an L1 metric of the reference signal, where the L1 metric includes an RSRP or an SINR, the measurement report including the L1 metric.

Aspect 18: The method of aspect 17, where measuring the L1 metric includes applying spatial domain filtering or time domain filtering to the L1 metric.

Aspect 19: A method for wireless communication at a BS, including: transmitting, to a UE, a configuration for the UE to measure a reference signal of a non-serving cell; receiving a measurement report from the UE, where receiving the measurement report triggers an update for a TCI state associated with the reference signal of the non-serving cell; and applying the update for the TCI state associated with the reference signal.

Aspect 20: The method of aspect 19, further including: transmitting, to the UE, a rule for applying the update for the TCI state associated with the reference signal, where applying the update for the TCI state associated with the reference signal is based at least in part on the rule for applying the update for the TCI state associated with the reference signal.

Aspect 21: The method of any of aspects 19 or 20, where receiving the measurement report includes receiving an indication that a first metric associated with the reference signal is greater than a second metric associated with a second reference signal, the second reference signal being a source reference signal of the TCI state; and applying the update to the TCI state associated with the reference signal includes changing the source reference signal of the TCI state from the second reference signal to the reference signal, where the reference signal and the second reference signal are both of the non-serving cell.

Aspect 22: The method of any of aspects 19 or 20, where receiving the measurement report includes receiving an indication that a first metric associated with the reference signal fails to satisfy a threshold; and applying the update for the TCI state associated with the reference signal includes deactivating the TCI state associated with the reference signal of the non-serving cell based at least in part on the first metric associated with the reference signal failing to satisfy the threshold.

Aspect 23: The method of any of aspects 19-22, further including: starting a timer based at least in part on receiving the measurement report or transmitting an ACK responsive to the measurement report to the UE, where the update for the TCI state associated with the reference signal is applied prior to an expiration of the timer.

Aspect 24: The method of any of aspects 19-23, further including: transmitting, to the UE, a configuration of a triggering condition associated with the measurement report, where receiving the measurement report from the UE is based at least in part on transmitting the triggering condition to the UE.

Aspect 25: The method of any of aspects 19-24, further including: transmitting, to the UE, a request for the measurement report, where receiving the measurement report from the UE is based at least in part on transmitting the request for the measurement report to the UE.

Aspect 26: The method of any of aspects 19-25, further including: transmitting, to the UE, an ACK responsive to the measurement report, the ACK indicating a successful reception of the measurement report at the BS.

Aspect 27: The method of any of aspects 19-26, where receiving the measurement report from the UE includes: receiving an indication of an L1 metric of the reference signal, where the L1 metric includes an RSRP or an SINR.

Aspect 28: The method of any of aspects 19-27, further including: transmitting, to the UE, a message indicating the update for the TCI state associated with the reference signal of the non-serving cell, where the RRC message includes an indication of the reference signal of the non-serving cell, an indication of a cell ID associated with the non-serving cell, and QCL information associated with the TCI state.

Aspect 29: An apparatus for wireless communication at a UE, including at least a first interface, a processing system, and a second interface configured to cause the apparatus to perform a method of any of aspects 1-18.

Aspect 30: An apparatus for wireless communication at a UE, including a processor; memory coupled with the processor; and instructions stored in the memory and executable by the processor to cause the apparatus to perform a method of any of aspects 1-18.

Aspect 31: An apparatus for wireless communication at a UE, including at least one means for performing a method of any of aspects 1-18.

Aspect 32: A non-transitory computer-readable medium storing code for wireless communication at a UE, the code including instructions executable by a processor to perform a method of any of aspects 1-18.

Aspect 33: An apparatus for wireless communication at a UE, including at least a first interface, a processing system, and a second interface configured to cause the apparatus to perform a method of any of aspects 19-28.

Aspect 34: An apparatus for wireless communication at a BS, including a processor; memory coupled with the processor; and instructions stored in the memory and executable by the processor to cause the apparatus to perform a method of any of aspects 19-28.

Aspect 35: An apparatus for wireless communication at a BS, including at least one means for performing a method of any of aspects 19-28.

Aspect 36: A non-transitory computer-readable medium storing code for wireless communication at a BS, the code including instructions executable by a processor to perform a method of any of aspects 19-28.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. An apparatus for wireless communication at a user equipment (UE), comprising:
   a first interface configured to:
      obtain, from a serving cell, a configuration for the UE to measure a reference signal of a non-serving cell;
   a processing system configured to:
      measure the reference signal of the non-serving cell;
   the first interface or a second interface configured to:
      output a measurement report to the serving cell, the outputting of the measurement report triggering an autonomous update, at the UE, for a transmission configuration indicator (TCI) state associated with the reference signal of the non-serving cell; and
   the processing system further configured to:
      apply the autonomous update for the TCI state associated with the reference signal.

2. The apparatus of claim 1, wherein the first interface or the second interface is further configured to:
   obtain, from the serving cell, a rule for applying the autonomous update for the TCI state associated with the reference signal, the applying of the autonomous update for the TCI state associated with the reference signal being in accordance with the rule for applying the autonomous update for the TCI state associated with the reference signal.

3. The apparatus of claim 1, wherein:
   measuring the reference signal of the non-serving cell further comprises measuring a first metric associated with the reference signal greater than a second metric associated with a second reference signal, the second reference signal being a source reference signal of the TCI state; and
   applying the autonomous update for the TCI state associated with the reference signal further comprises changing the source reference signal of the TCI state from the second reference signal to the reference signal, both the reference signal and the second reference signal being of the non-serving cell.

4. The apparatus of claim 1, wherein:
   measuring the reference signal of the non-serving cell further comprises measuring a first metric associated with the reference signal that fails to satisfy a threshold; and
   applying the autonomous update for the TCI state associated with the reference signal further comprises deactivating the TCI state associated with the reference signal of the non-serving cell, the deactivating of the TCI state being associated with the first metric associated with the reference signal failing to satisfy the threshold.

5. The apparatus of claim 1, wherein the processing system is further configured to:
   measure a plurality of reference signals of the non-serving cell, each of the plurality of reference signals of the non-serving cell being measured with a metric that fails to satisfy a threshold, the non-serving cell being associated with the TCI state; and
   deactivate the TCI state associated with the non-serving cell, the deactivating of the TCI state being associated with each of the plurality of reference signals of the non-serving cell being measured with the metric that fails to satisfy the threshold.

6. The apparatus of claim 1, wherein the processing system is further configured to:
   start a timer after outputting the measurement report or obtaining an acknowledgement (ACK) responsive to the measurement report from the serving cell, the autonomous update for the TCI state associated with the reference signal being applied prior to an expiration of the timer.

7. The apparatus of claim 1, wherein the processing system is further configured to:
   satisfy a triggering condition associated with the measurement report, the outputting of the measurement report being associated with satisfying the triggering condition.

8. The apparatus of claim 7, wherein the first interface or the second interface is further configured to:
   obtain, from the serving cell, a configuration of the triggering condition associated with the measurement report.

9. The apparatus of claim 1, wherein the first interface or the second interface is further configured to:
   obtain, from the serving cell, a request for the measurement report, the outputting of the measurement report being associated with obtaining the request.

10. The apparatus of claim 1, wherein the first interface or the second interface is further configured to:
    output the measurement report over a physical uplink control channel (PUCCH) or a physical uplink shared channel (PUSCH).

11. The apparatus of claim 1, wherein the first interface or the second interface is further configured to:
    obtain, from the serving cell, an acknowledgement (ACK) responsive to the measurement report, the ACK indicating a successful reception of the measurement report at the serving cell.

12. The apparatus of claim 11, wherein the processing system is further configured to:
    start a timer after outputting the measurement report; and
    monitor for the ACK responsive to the measurement report for a duration of the timer.

13. An apparatus for wireless communication at a network device, comprising:
    a first interface configured to:
       output, to a user equipment (UE), a configuration for the UE to measure a reference signal of a non-serving cell;
    the first interface or a second interface configured to:
       obtain a measurement report from the UE, the obtaining of the measurement report triggering an autonomous update, at the network device, for a transmission configuration indicator (TCI) state associated with the reference signal of the non-serving cell; and
    a processing system configured to:
       apply the autonomous update for the TCI state associated with the reference signal.

14. The apparatus of claim 13, wherein the first interface or the second interface is further configured to:
    output, to the UE, a rule for applying the autonomous update for the TCI state associated with the reference signal, the applying of the autonomous update for the TCI state associated with the reference signal being in accordance with the rule for applying the autonomous update for the TCI state associated with the reference signal.

15. The apparatus of claim 13, wherein:
    receiving the measurement report further comprises receiving an indication that a first metric associated with the reference signal is greater than a second metric associated with a second reference signal, the second reference signal being a source reference signal of the TCI state; and applying the autonomous update to the TCI state associated with the reference signal further comprises changing the source reference signal of the TCI state from the second reference signal to the reference signal, both the reference signal and the second reference signal being of the non-serving cell.

16. The apparatus of claim 13, wherein:
receiving the measurement report further comprises receiving an indication that a first metric associated with the reference signal fails to satisfy a threshold; and
applying the autonomous update for the TCI state associated with the reference signal further comprises deactivating the TCI state associated with the reference signal of the non-serving cell, the deactivating of the TCI state being associated with the first metric associated with the reference signal failing to satisfy the threshold.

17. The apparatus of claim 13, wherein the processing system is further configured to:
start a timer after obtaining the measurement report or outputting an acknowledgement (ACK) responsive to the measurement report to the UE, the autonomous update for the TCI state associated with the reference signal being applied prior to an expiration of the timer.

18. The apparatus of claim 13, wherein the first interface or the second interface is further configured to:
output, to the UE, a configuration of a triggering condition associated with the measurement report, the obtaining of the measurement report from the UE being associated with outputting the triggering condition to the UE.

19. The apparatus of claim 13, wherein the first interface or the second interface is further configured to:
output, to the UE, a request for the measurement report, the obtaining of the measurement report from the UE being associated with outputting the request for the measurement report to the UE.

20. The apparatus of claim 13, wherein the first interface or the second interface is further configured to:
output, to the UE, an acknowledgement (ACK) responsive to the measurement report, the ACK indicating a successful reception of the measurement report at the network device.

21. The apparatus of claim 13, wherein the first interface or the second interface is further configured to:
output, to the UE, a message indicating an update for the TCI state associated with the reference signal of the non-serving cell, the message including an indication of the reference signal of the non-serving cell, an indication of a cell identifier (ID) associated with the non-serving cell, and quasi-colocation (QCL) information associated with the TCI state.

22. A method for wireless communication at a user equipment (UE), comprising:
receiving, from a serving cell, a configuration for the UE to measure a reference signal of a non-serving cell;
measuring the reference signal of the non-serving cell;
transmitting a measurement report to the serving cell, the transmitting of the measurement report triggering an autonomous update, at the UE, for a transmission configuration indicator (TCI) state associated with the reference signal of the non-serving cell; and
applying the autonomous update for the TCI state associated with the reference signal.

23. The method of claim 22, further comprising:
receiving, from the serving cell, a rule for applying the autonomous update for the TCI state associated with the reference signal, the applying of the autonomous update for the TCI state associated with the reference signal being in accordance with the rule for applying the autonomous update for the TCI state associated with the reference signal.

24. The method of claim 22, wherein:
measuring the reference signal of the non-serving cell comprises measuring a first metric associated with the reference signal greater than a second metric associated with a second reference signal, the second reference signal being a source reference signal of the TCI state; and
applying the autonomous update for the TCI state associated with the reference signal comprises changing the source reference signal of the TCI state from the second reference signal to the reference signal, both the reference signal and the second reference signal being of the non-serving cell.

25. The method of claim 22, wherein:
measuring the reference signal of the non-serving cell comprises measuring a first metric associated with the reference signal that fails to satisfy a threshold; and
applying the autonomous update for the TCI state associated with the reference signal comprises deactivating the TCI state associated with the reference signal of the non-serving cell, the deactivating of the TCI state being associated with the first metric associated with the reference signal failing to satisfy the threshold.

26. A method for wireless communication at a network device, comprising:
transmitting, to a user equipment (UE), a configuration for the UE to measure a reference signal of a non-serving cell;
receiving a measurement report from the UE, the receiving of the measurement report triggering an autonomous update, at the network device, for a transmission configuration indicator (TCI) state associated with the reference signal of the non-serving cell; and
applying the autonomous update for the TCI state associated with the reference signal.

27. The method of claim 26, further comprising:
transmitting, to the UE, a rule for applying the autonomous update for the TCI state associated with the reference signal, the applying of the autonomous update for the TCI state associated with the reference signal being in accordance with the rule for applying the autonomous update for the TCI state associated with the reference signal.

28. The method of claim 26, wherein:
receiving the measurement report comprises receiving an indication that a first metric associated with the reference signal is greater than a second metric associated with a second reference signal, the second reference signal being a source reference signal of the TCI state; and
applying the autonomous update to the TCI state associated with the reference signal comprises changing the source reference signal of the TCI state from the second reference signal to the reference signal, both the reference signal and the second reference signal being of the non-serving cell.

29. The method of claim 26, wherein:
receiving the measurement report comprises receiving an indication that a first metric associated with the reference signal fails to satisfy a threshold; and
applying the autonomous update for the TCI state associated with the reference signal comprises deactivating the TCI state associated with the reference signal of the non-serving cell, the deactivating of the TCI state being associated with the first metric associated with the reference signal failing to satisfy the threshold.

30. The method of claim 26, further comprising:
starting a timer after receiving the measurement report or transmitting an acknowledgement (ACK) responsive to the measurement report to the UE, the autonomous update for the TCI state associated with the reference signal being applied prior to an expiration of the timer.

* * * * *